United States Patent
Iizuka

[19]

[11] Patent Number: 6,166,843
[45] Date of Patent: *Dec. 26, 2000

[54] OPTICAL SCANNING SYSTEM WITH SINGLE ELEMENT REFRACTIVE/ REFLECTIVE Fθ LENS AND SINGLE ELEMENT REFRACTIVE/REFLECTIVE Fθ LENS

[75] Inventor: Takashi Iizuka, Westminster, Colo.

[73] Assignee: Asahi Kogaku Kogyo Kabushiki Kaisha, Tokyo, Japan

[*] Notice: This patent is subject to a terminal disclaimer.

[21] Appl. No.: 09/223,976

[22] Filed: Dec. 31, 1998

Related U.S. Application Data

[63] Continuation of application No. 08/972,056, Nov. 17, 1997, Pat. No. 5,963,355.

[51] Int. Cl.[7] .................................................. G02B 26/08
[52] U.S. Cl. ..................... 359/208; 359/205; 359/207; 359/216
[58] Field of Search ................................... 359/205–208, 359/216–219

[56] References Cited

U.S. PATENT DOCUMENTS

| | | |
|---|---|---|
| 4,852,957 | 8/1989 | Wakimoto et al. . |
| 5,189,546 | 2/1993 | Iizuka . |
| 5,408,095 | 4/1995 | Atsuumi . |
| 5,541,760 | 7/1996 | Iizuka et al. . |
| 5,543,955 | 8/1996 | Yamazaki et al. . |
| 5,572,353 | 11/1996 | Iizuka et al. . |
| 5,596,424 | 1/1997 | Iizuka et al. . |
| 5,604,622 | 2/1997 | Iizuka et al. . |
| 5,646,767 | 7/1997 | Iima et al. . |
| 5,648,865 | 7/1997 | Iizuka . |
| 5,748,354 | 5/1998 | Iizuka . |
| 5,777,774 | 7/1998 | Iizuka . |
| 5,825,403 | 10/1998 | Iima et al. . |
| 5,963,355 | 10/1999 | Iizuka ...................................... 359/205 |

FOREIGN PATENT DOCUMENTS

| | | |
|---|---|---|
| 0288074 | 11/1995 | European Pat. Off. . |
| 9-68664 | 3/1997 | Japan . |

*Primary Examiner*—James Phan
*Attorney, Agent, or Firm*—Greenblum & Bernstein P.L.C.

[57] ABSTRACT

A scanning optical system includes a light deflector and a light emitter which emits a beam of light which scans a scanning surface along a main scanning direction. The beam of light emitted by the emitter is incident onto the light deflector as a non-convergent beam of light in the main scanning direction. Further, an optical element which has a reflecting surface is utilized as an fθ element. The optical element includes a first surface onto which light from the light deflector is incident, and from which light transmitted through the optical element is emitted and a second surface which is provided with a reflective surface thereon. Further, at least the second surface of the optical element is shaped so as to have no rotational axis and to not be rotationally symmetrical about an optical axis. Additionally, at least one surface of the optical element is tilted with respect to an axis perpendicular to the beam of light incident thereon. Further, the optical axis of a surface of the optical element can be shifted (i.e., decentered) in an auxiliary scanning direction, transverse to the main scanning direction, with respect to the optical axis of the scanning optical system.

7 Claims, 19 Drawing Sheets

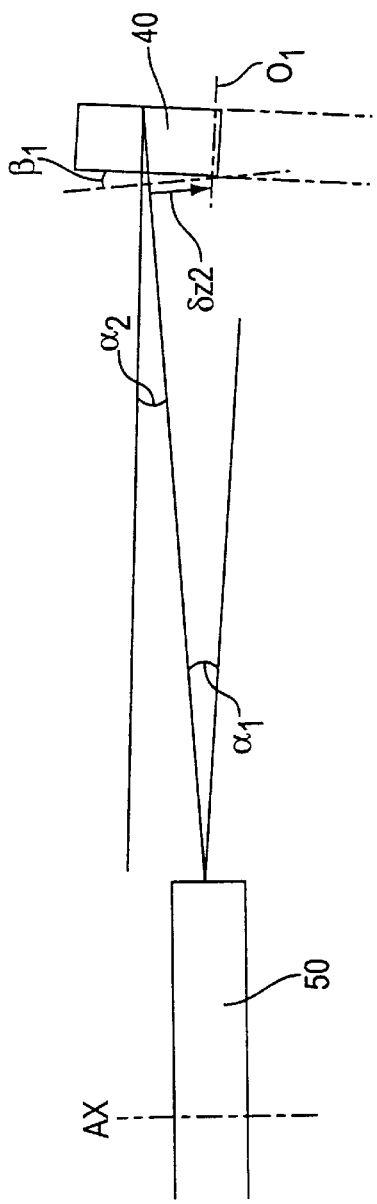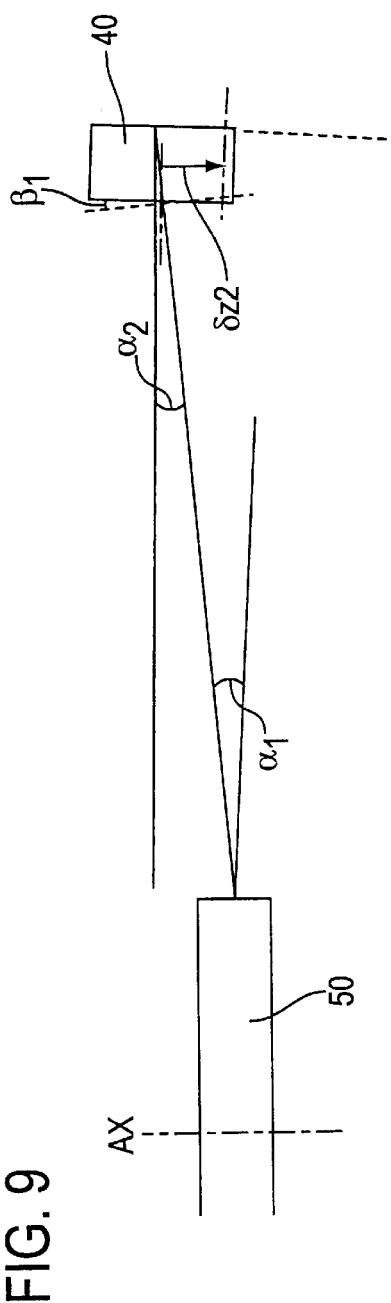

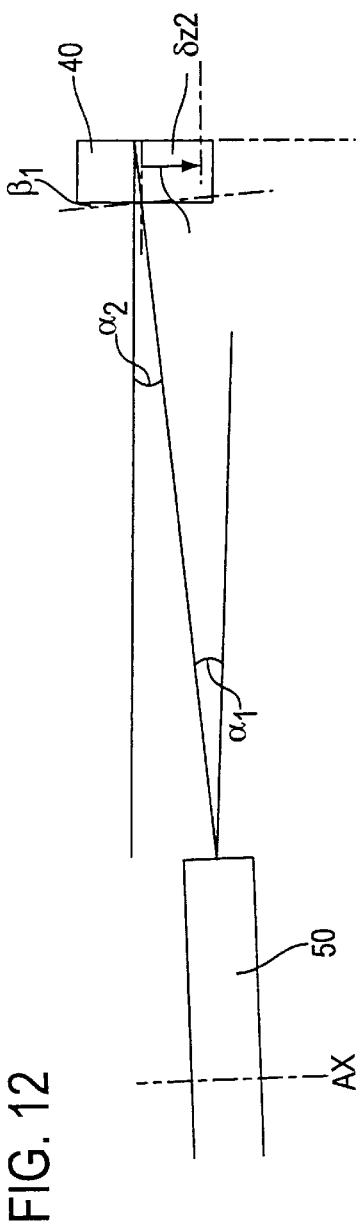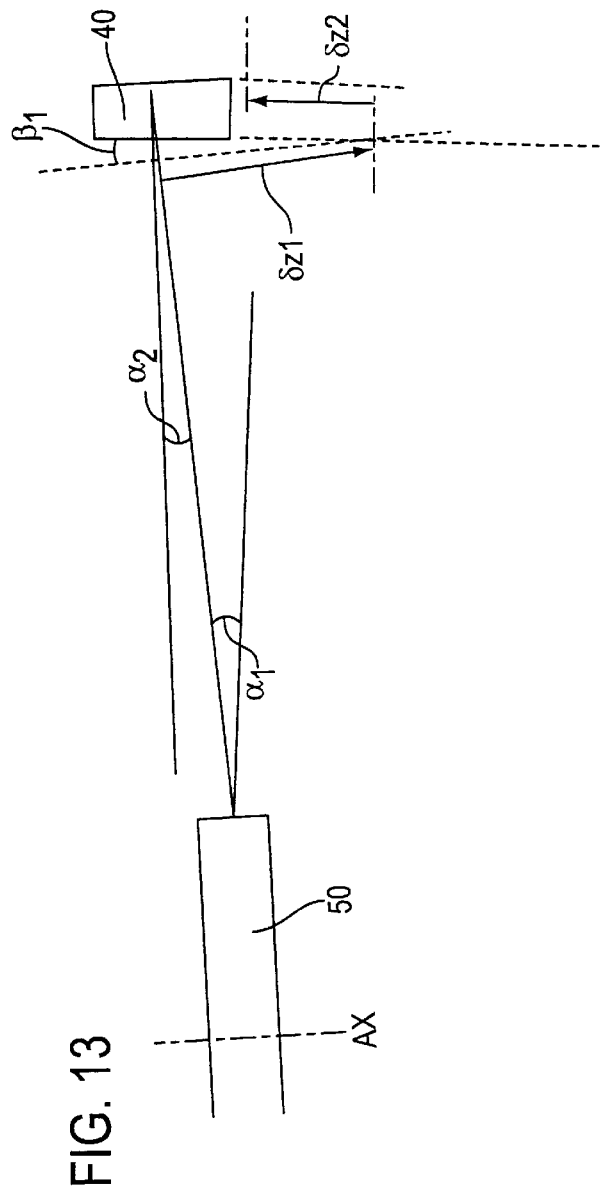
FIG. 12
FIG. 13

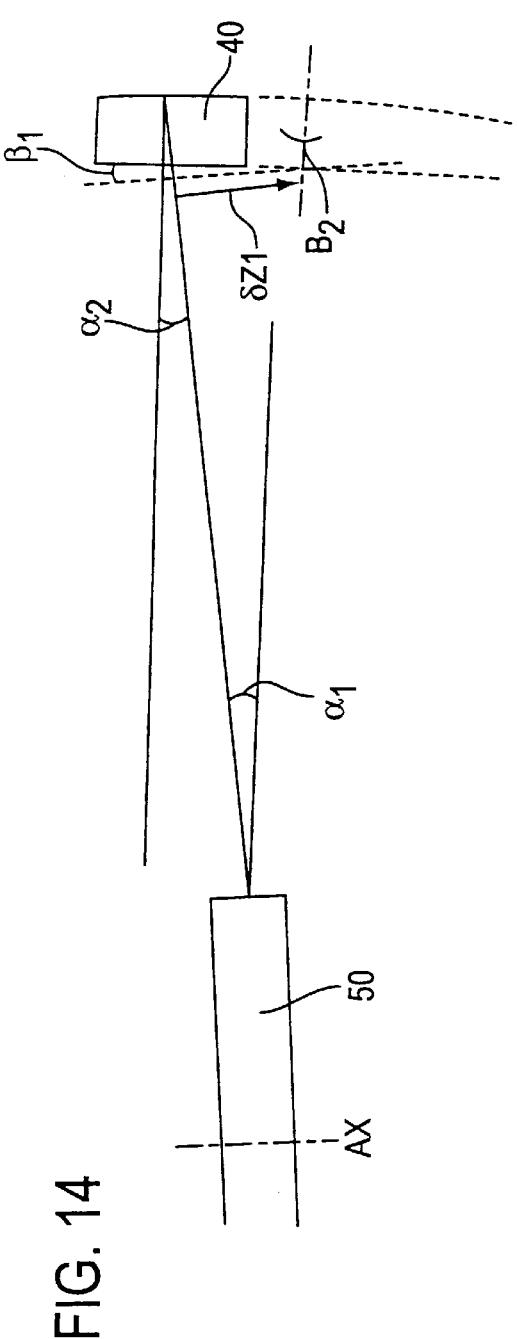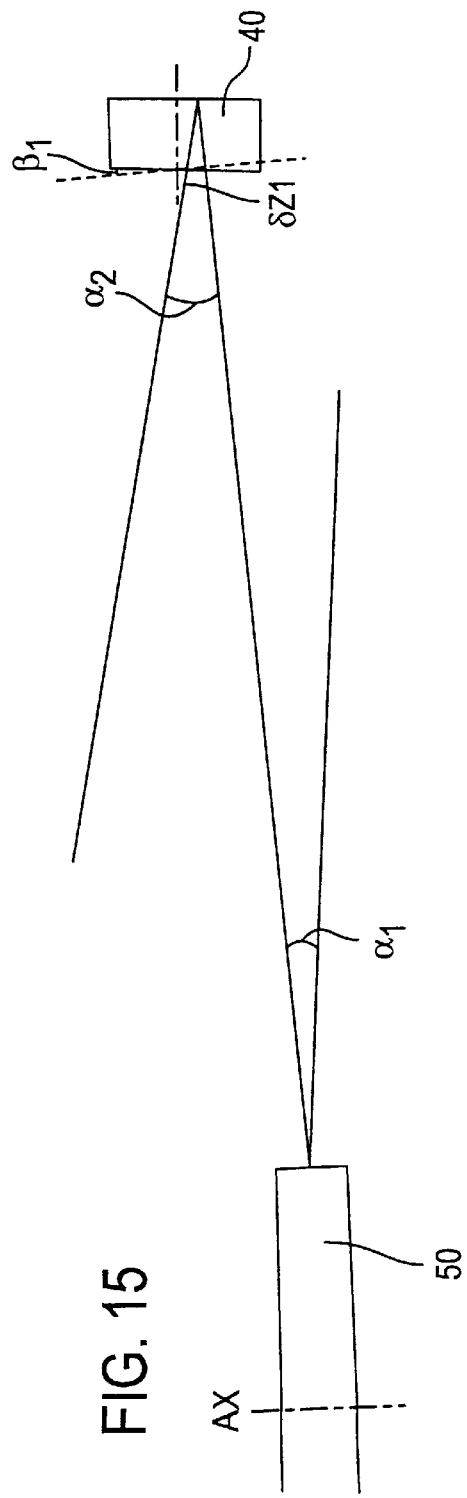
FIG. 14
FIG. 15

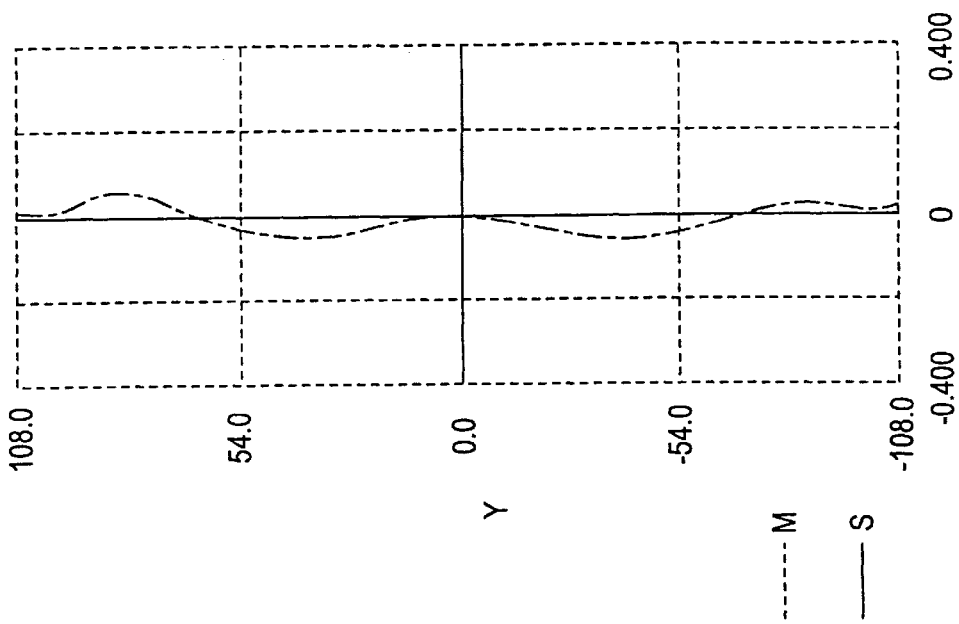
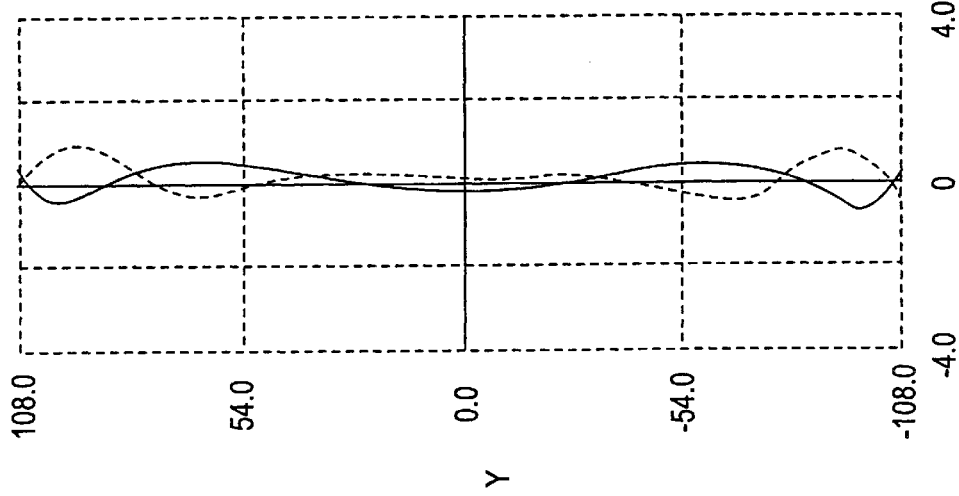
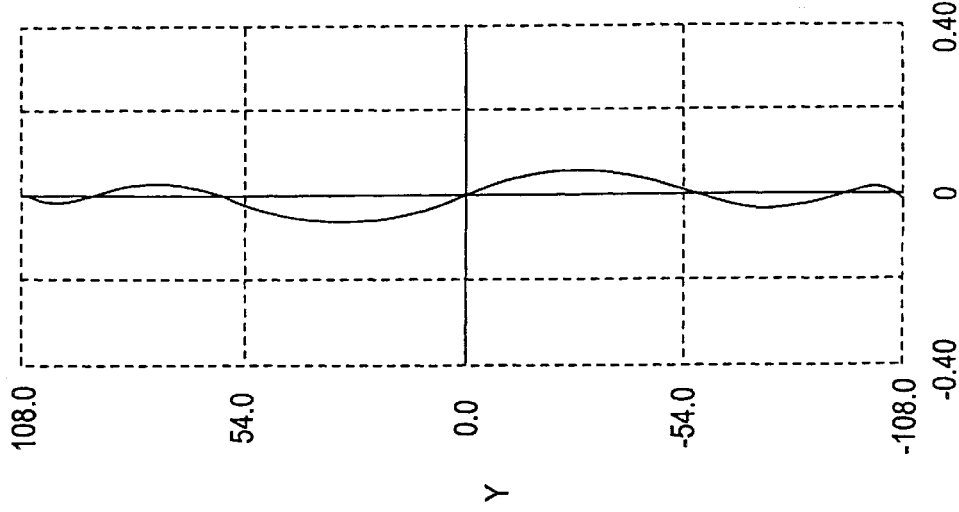

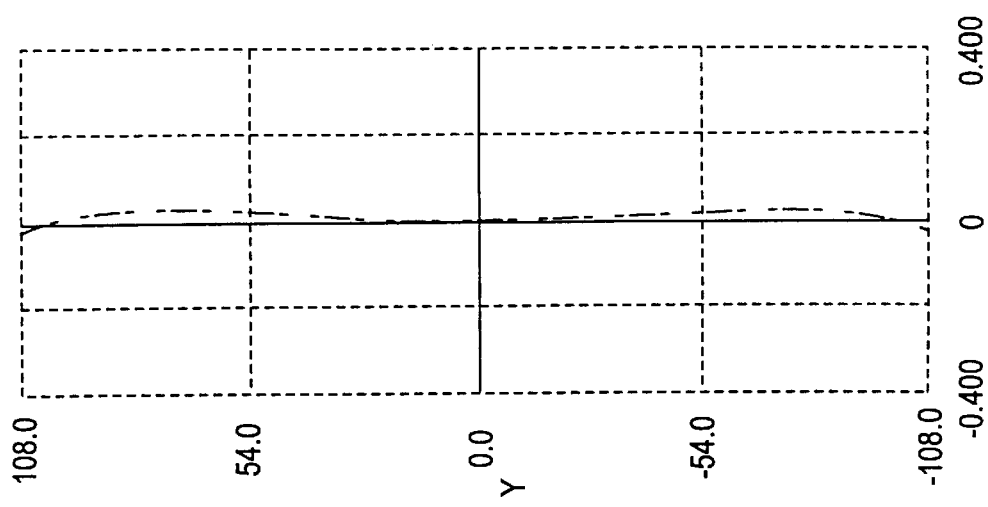
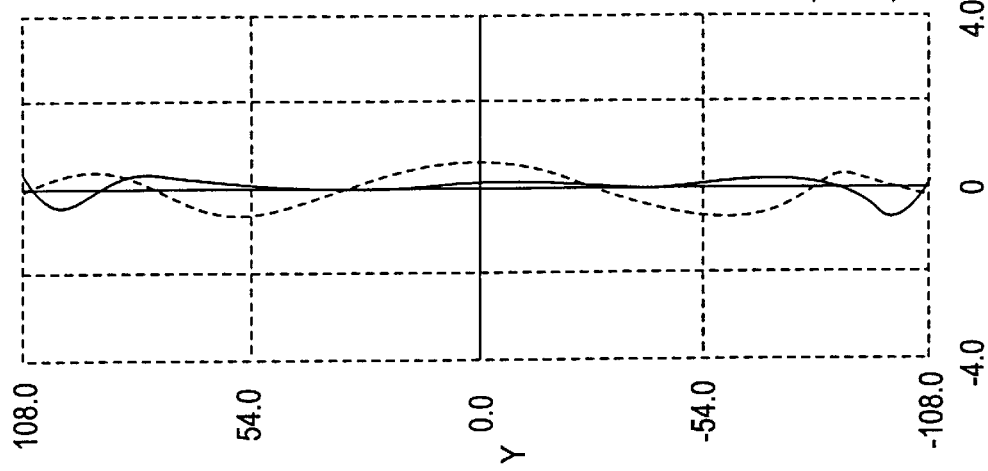
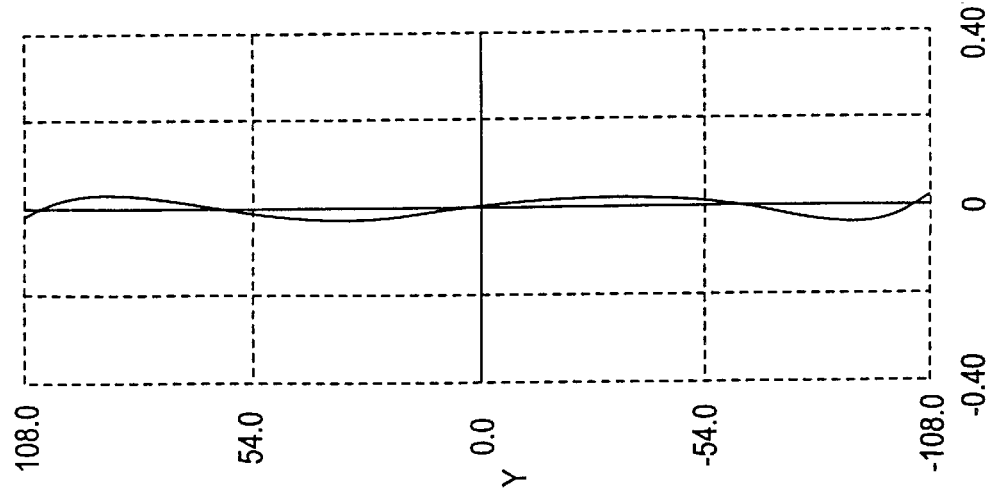

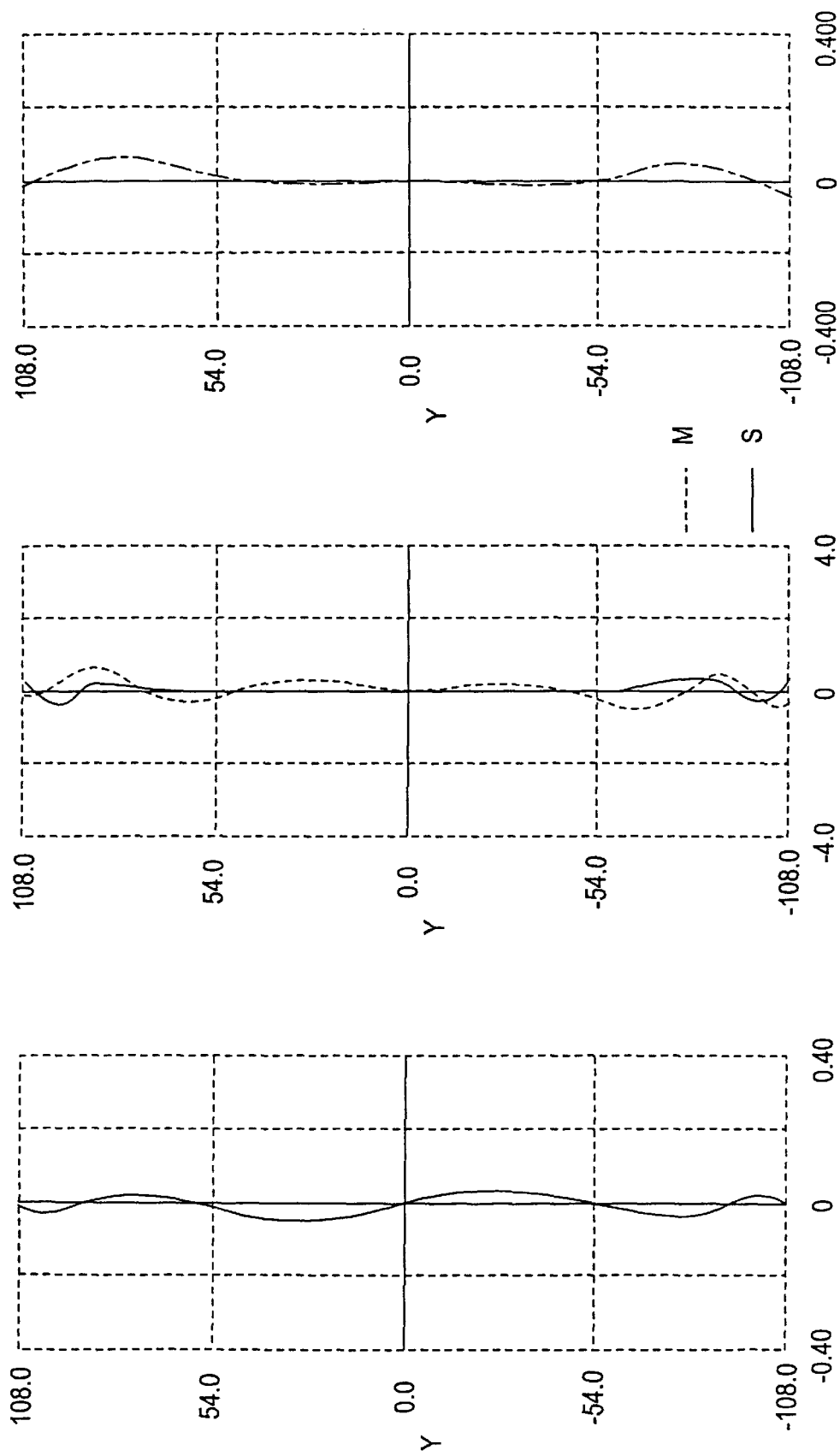

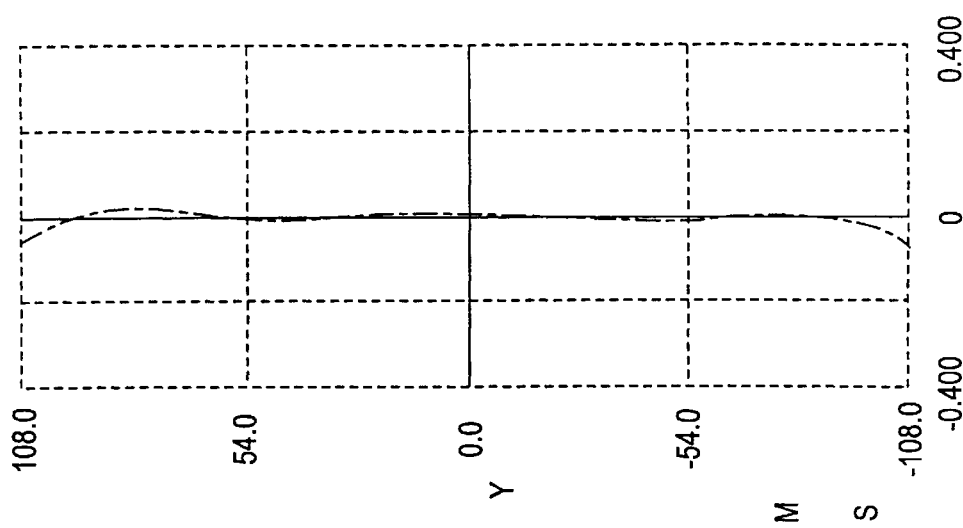
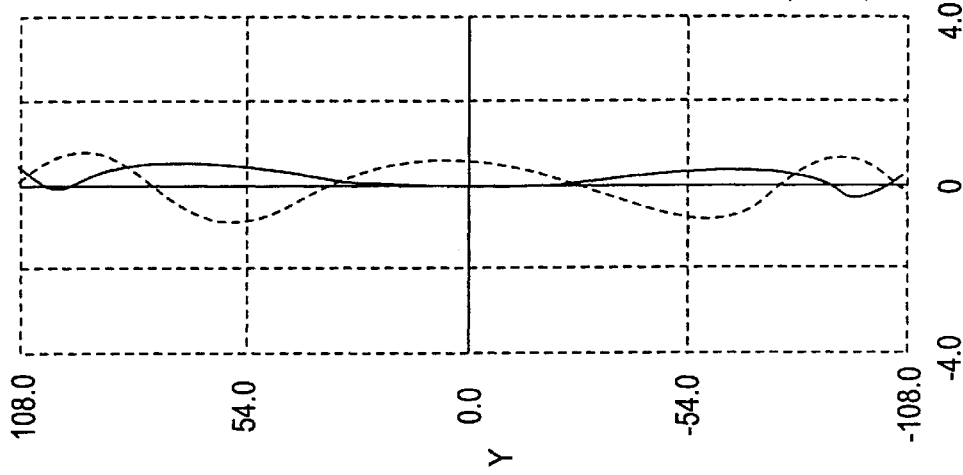
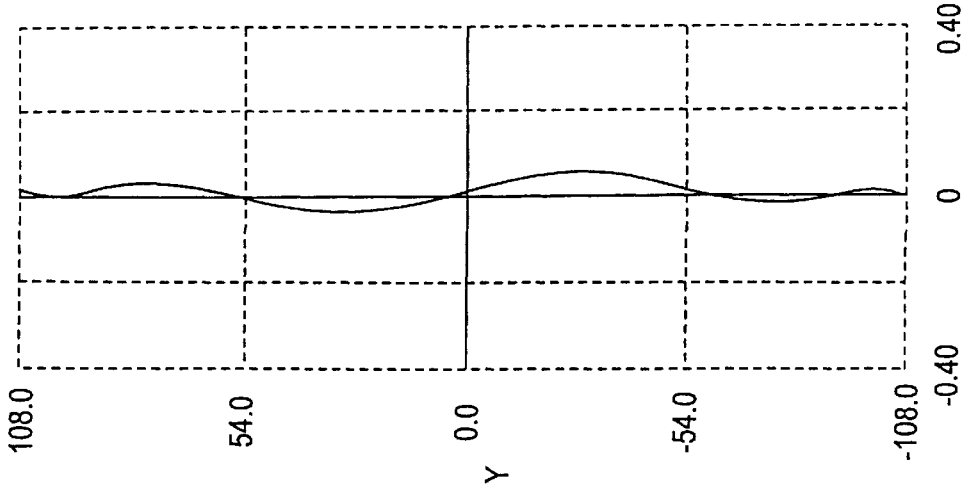

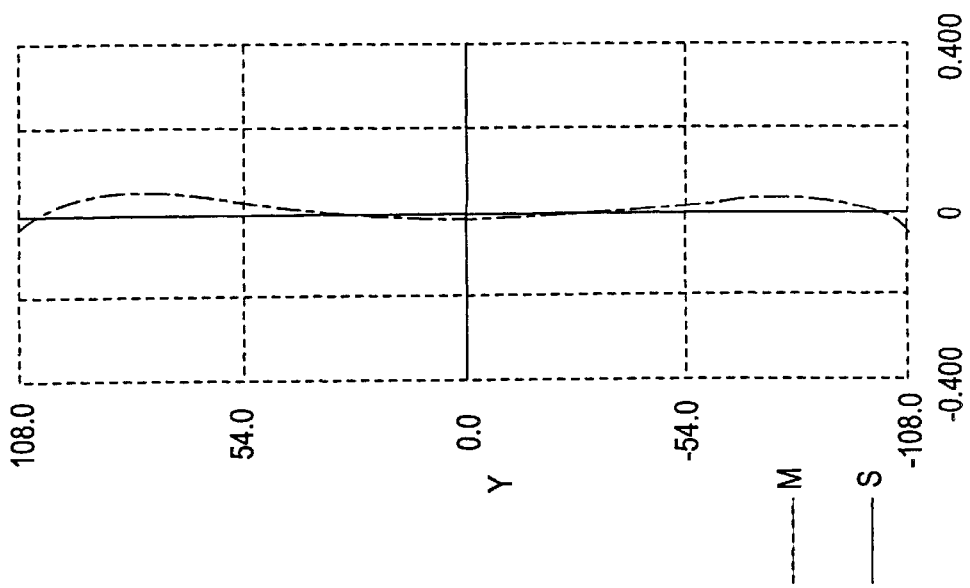
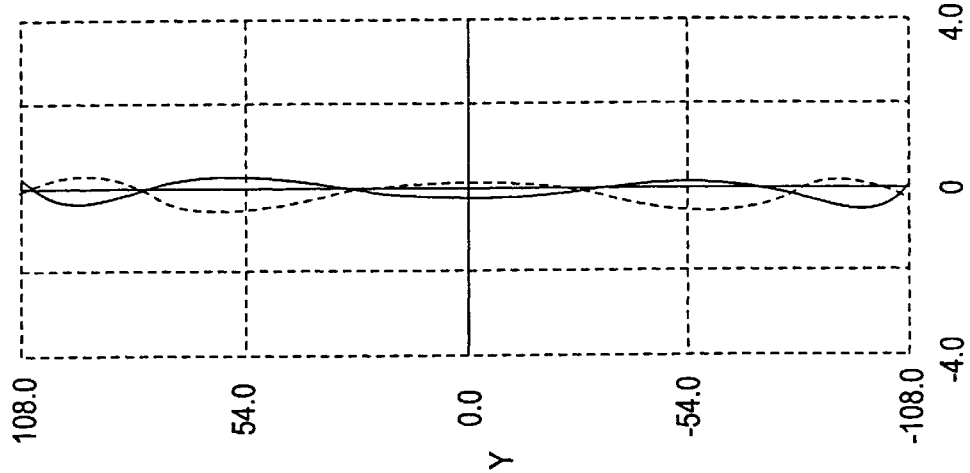
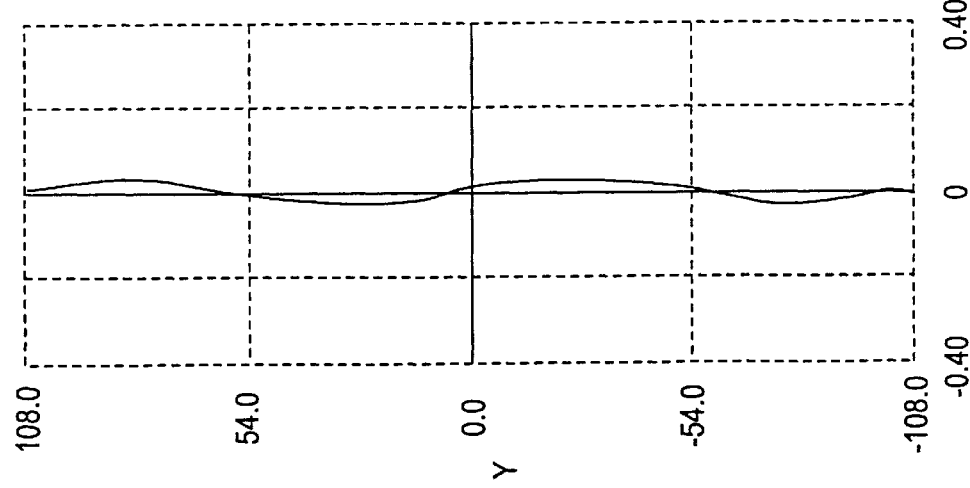

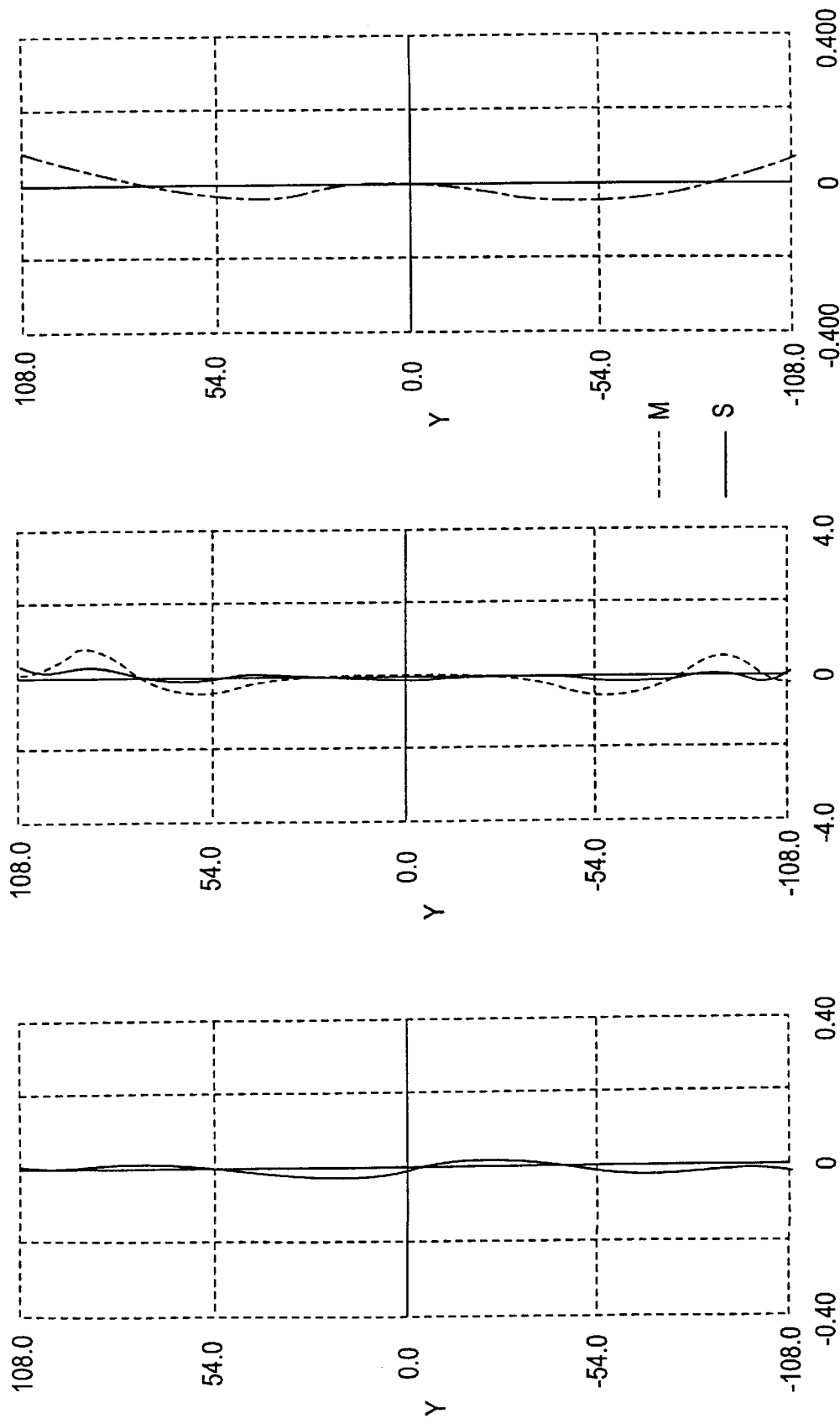

OPTICAL SCANNING SYSTEM WITH SINGLE ELEMENT REFRACTIVE/REFLECTIVE Fθ LENS AND SINGLE ELEMENT REFRACTIVE/REFLECTIVE Fθ LENS

This is a continuation of application Ser. No. 08/972,056, now U.S. Pat. No. 5,963,355 filed Nov. 17, 1997, the contents of which are herein incorporated by reference in its entirety.

BACKGROUND OF THE INVENTION

1. Field of the Invention

The present invention relates to a scanning optical system and particularly to a scanning optical system for use in a printer, data symbol (e.g., bar code) reader, facsimile machine or other such apparatus. In particular, the present invention is related to a new and improved single element fθ lens unit for use in such a scanning optical system. Further, the present invention is related to a single element fθ lens unit with a reflective (i.e., mirror) surface with superior aberration compensation characteristics. The present invention is additionally related to a scanning optical system for use in a laser beam printer which can employ a single element refractive/reflective fθ optical element.

The present invention is also related to a laser scanning optical system including a reading optical system for reading information on an object surface and/or an image forming optical system for forming an image on a photoconductive surface.

The present invention is further related to a mirror surfaced fθ lens having at least one surface which is a rotationally asymmetrical aspherical surface, such as a two dimensional polynomial aspherical surface. With respect to a light beam incident on the mirrored surface fθ lens of the present invention, three optical surfaces are provided, one surface being a reflective optical surface and two surfaces comprising refractive optical surfaces. The refractive/reflective single element fθ lens of the present invention also serves to converge a divergent or parallel light beam incident thereon.

2. Background and Material Information

A conventional laser scanning optical system is provided with a light source such as a semiconductor laser, a light deflecting device such as a polygonal mirror, and a scanning lens system such as an fθ lens system. A laser beam is emitted by the light source, and is deflected by the light deflecting device. The deflected laser beam is then passed through the fθ lens system to scan a predetermined area on an object surface. Such scanning on the object surface by the deflected laser beam is referred to as scanning in the main scanning direction. While scanning in the main scanning direction is being carried out, the object surface is moved in a direction orthogonal to the direction of the main scanning, i.e., in an auxiliary scanning direction, and an auxiliary scanning is executed. Thus, the object surface is scanned two-dimensionally (i.e., in directions orthogonal with respect to each other).

Scanning optical systems generally include a plurality of lenses having complex shapes. In particular, such multiple element systems utilize anamorphic polished glass fθ lenses. Recently, to reduce the cost of the fθ lens system, plastic fθ lenses are used instead of glass fθ lenses.

A reflective type fθ element has also been utilized in an optical scanning system. Such reflective type fθ elements are shown, for example, in U.S. Pat. Nos. 5,572,353, 5,604,622 and 5,408,095. Each of these patents utilize an additional compensating optical element to compensate for various aberrations and to achieve acceptable quality. However, because the use of such a reflective element requires the utilization of an additional compensating lens to ensure that aberrations are adequately controlled, the complexity and size of the mechanism as well as the cost of the scanning system are increased.

Further, in these above-noted patents, an additional compensating element in the form of a toric lens is provided. However, since this lens is large, its cost is high and it would be advantageous, at least from a cost perspective, to eliminate such lens. However, if the toric lens is eliminated, it becomes very difficult to achieve the fθ function and to correct for curvature of field.

Other scanning systems are known which utilize an fθ element having opposing aspherical surfaces, one of which (the rear surface), is provided with a mirror. However, in such prior art, a polygonal mirror and an object surface (photosensitive drum) are located along an extention of the optical axis of the fθ element. As a result of this arrangement, the light emitted by the fθ element toward an object surface passes by the polygonal mirror, and the scanning optical system is very difficult to lay out. (i.e. to design)

It is well known that in the design of optical systems for, e.g., laser scanning units, various types of aberrations must be considered and controlled in order to ensure that adequate optical performance is provided. Some of these aberrations include fθ characteristic error, curvature of field and bowing of the scan line.

Fθ characteristic (linearity error) is related to variations in the speed of the beam with respect to the surface of the scanning (photosensitive image forming) surface. Curvature of field is related to the defocus of a light beam with respect to the photosensitive surface. In other words, if the beam focus point is not precisely on the photosensitive layer, the beam diameter will increase and will result in a fuzzy image.

Bowing of the scan line is generated because of the fact that the fθ element, which can include a reflective surface, is tilted so that the beam reflected thereby passes out of the plane which includes the light beam emitted by the light source and the beam deflected by the light deflecting element. In other words, because of the tilting of the (reflective surface) fθ element, the beam reflected thereby forms a scanning line which is curved in the direction of the auxiliary scanning direction. In other words, a "bow" (i.e., a bend of the scanning line in the auxiliary scanning direction) occurs due to the tilted arrangement of the fθ element (reflective surface). Usually, to adequately eliminate these aberrations, as noted above, several lens elements are necessary in a scanning optical system.

Another approach to eliminating the effect of (or at least controlling) these aberrations has been to utilize what is known as a post objective type scanning optical system, employing a reflective fθ element formed as a concave mirror wherein the back side surface of the element is a reflective surface. A system of this sort is disclosed in U.S. Pat. No. 4,852,957. Both surfaces of the concave mirror utilized therein are formed as spherical surfaces and a glass plate of the mirror compensates for aberrations and a light converging means is located between the light source and the deflector.

As noted above, such prior art scanning systems utilize optical compensating elements, and it is a prime function of the present invention to eliminate the need for such additional compensating elements while still maintaining the optical characteristics of the fθ system. Thus, the present invention differs from the above-noted prior art by utilizing only a single optical element between the light deflecting member and the scanned surface while the prior art utilizes two elements and in utilizing more complex shapes, at least for a reflective face of the surface of the fθ element, i.e., shapes not having an axis of rotation.

SUMMARY OF THE INVENTION

It is a primary object of the present invention to provide a scanning optical system which utilizes a single element fθ lens. The single element fθ lens of the present invention has a front side surface facing the light deflecting device, which provides a refractive surface and an opposite or back side surface (facing away from the light deflecting device), having a reflective (mirrored) surface. Although the scanning optical system of the present invention utilizes an fθ lens which comprises a single lens component, the fθ lens is able to adequately correct linearity, curvature of field, and at bow of the scan line at the same time since, in effect, three surfaces are provided.

It is thus a primary objective of the present invention to provide a scanning optical system which is simple in construction and provides appropriate performance at an inexpensive price.

According to an important feature of the present invention, the single component fθ system utilizes, for at least the back side surface of the element, a reflective surface which does not have axis of rotation. In other words, the aspherical surface of the back side surface (i.e., reflective side of the fθ lens) of the present invention is not generated by rotation about an axis of rotation and is not rotationally symmetrical about the optical axis of the element.

According to a further feature of the present invention, the optical axis of the fθ element is positioned to not be perpendicular to the rotational axis of the light deflecting device (polygonal mirror). In other words, the fθ element is tilted. According to a yet further feature of the present invention, the front side and/or back side surface of the fθ element can be decentered, i.e., the optical axis of the fθ element is shifted from the optical axis of the scanning system. Additionally, while the back side surface is formed to have a more complex surface (i.e., one not having a rotational axis and not being rotationally symmetrical about the optical axis) so as to eliminate variations in pitch and bowing, both surfaces of the fθ element can be formed of such complex shapes.

As a result of the tilting of the surface of the fθ element, the light passes further from the light deflector and the scanning optical system is easier to lay out and design since the light is deflected from the mirror of the present invention at a relatively large angle (about 6° according to the particular embodiments of the present invention as will be set forth hereinbelow). Furthermore, bowing of the scan line and wave front aberration are compensated by decentering of the fθ element.

The above-noted advantages of the present invention are achieved by providing a scanning optical system that includes a light deflector that rotates about a rotational axis transverse to a main scanning direction and a light emitter that emits a beam of light which scans a scanning surface along the main scanning direction. The beam of light emitted by the emitter is incident onto the light deflector as a non-converging beam of light in the main scanning direction. An optical element is also provided to refract and reflect the beam of light, deflected by the light deflector. The optical element has a first surface onto which the beam of light from the light deflector is incident and a second surface provided with a reflective surface. The reflective surface reflects the beam of light after the beam of light is transmitted through the optical element. The beam of light is again transmitted through the optical element after being reflected by the reflective surface to be emitted from the optical element at the first surface. At least the second surface of the optical element is a surface which has no rotational axis and which is not rotationally symmetrical about an optical axis.

The scanning optical system further includes a collimating lens positioned along an optical path between the light emitter and the light deflector, and a lens element that converges light from the collimating lens onto the light deflector in an auxiliary scanning section. The light deflector can be a polygonal mirror. The lens element can optionally be a cylindrical lens. The non-converging beam of light incident onto the light deflector can be a parallel beam of light according to one aspect of the invention. The non-converging beam of light incident onto the light deflector can be a divergent beam of light according to another aspect of the invention.

According to further features of the present invention, the second surface of the optical element can be an advanced anamorphic aspherical surface, or a two-dimensional polynomial aspherical surface, while the first surface of the optical element can be a rotationally symmetrical aspherical surface, a toric aspherical surface. an advanced anamorphic aspherical surface or a two-dimensional polynomial aspherical surface.

According to a further feature, the optical element also converges the non-converging light beam deflected by the light deflector in the main scanning direction. Additionally, an optical axis of the optical element is shifted, in the auxiliary scanning direction, from an optical axis of the scanning optical system. Also, at least one surface of the optical element is tilted with respect to an axis perpendicular to the beam of light incident onto the optical element. Further, the scanning optical system of the present invention satisfies the relationship $\alpha2/\alpha1>0.50$ where $\alpha1$ represents an angle between the beam of light incident onto and reflected by the light deflector, and $\alpha2$ represents an angle between the beam of light incident onto and emitted by the fθ optical element.

A further feature of the present invention relates to an optical element for use with a scanning optical system in which a beam of light is deflected in a main scanning direction. The optical element includes a first surface onto which a beam of light is incident and from which the beam of light is emitted and a second surface, opposite to the first surface along a direction of the beam of light. The second surface comprises a reflective surface, the second surface is a surface without a rotational axis and the second surface converges the beam of light in a main scanning direction onto a scanning surface. Thus, light incident onto the first surface is transmitted through the optical element to the second surface, is reflected by the second surface and is again transmitted through the optical element to be emitted from the first surface.

The second surface of the optical element can be an advanced anamorphic aspherical surface or a two-dimensional polynomial aspherical surface, while the first surface of the optical element can be a rotationally symmetrical aspherical surface, a toric aspherical surface, an advanced anamorphic aspherical surface, or a two-dimensional polynomial aspherical surface.

According to a further feature of the present invention, at least one surface of the optical element is tilted with respect to an axis perpendicular to the beam of light incident onto the optical element.

The present invention is also related to a scanning optical system including a light source that emits a beam of light and a light deflector that rotates about a rotational axis, the light deflector deflecting the beam of light emitted by the light source. An optical element is positioned to receive the beam of light emitted by the light source and deflected by the light deflector. The beam of light is incident onto a first surface of the optical element, is transmitted through the optical element, is reflected by a second surface of the optical element, is again transmitted through the optical element and is emitted by the first surface of the optical element. The scanning optical system satisfies the relationship $\alpha 2/\alpha 1 > 0.50$ where $\alpha 1$ represents an angle between the beam of light incident onto and reflected by the light deflector and $\alpha 2$ represents an angle between the beam of light incident onto and emitted by the fθ optical element.

The second surface of the optical element can be an advanced anamorphic aspherical surface or a two-dimensional polynomial aspherical surface while the first surface of the optical element can be a rotationally symmetrical aspherical surface, a toric aspherical surface, an advanced anamorphic aspherical surface or a two-dimensional polynomial aspherical surface.

The scanning optical system further includes a collimating lens positioned along an optical path between the light emitter and the light deflector, and a lens element that converges light from the collimating lens onto the light deflector in an auxiliary scanning section. The lens element can be (but need not be) a cylindrical lens. The non-converging beam of light incident onto the light deflector can be a parallel beam of light or the non-converging beam of light incident onto the light deflector can be a divergent beam of light. Further, the scanning optical system of the present invention can satisfy the relationship $0.25 < d3/d6 < 0.40$ where d3 represents a distance between the light deflector and the first (front) surface of the optical element and d6 represents a distance between the first (front) surface of the optical element and a scanned surface.

Further, the optical element can converge the non-converging light beam deflected by the light deflector. Additionally, an optical axis of the optical element can be shifted, in the auxiliary scanning direction, from an optical axis of the scanning optical system. Also, at least one surface of the optical element can be tilted with respect to an axis perpendicular to the beam of light incident onto the optical element.

BRIEF DESCRIPTION OF THE DRAWINGS

The aforegoing and other objects, features and advantages of the present invention will be readily apparent from the following more particularly detailed description of preferred embodiments of the present invention, as illustrated in the accompanying drawings, which are presented merely to describe several non-limiting examples, in which the same reference characters refer to the same parts throughout the various views, and wherein:

FIG. 8 shows an arrangement of the components of the scanning optical system according to a first embodiment of the present invention, taken in the auxiliary scanning direction;

FIG. 9 shows an arrangement of the components of the scanning optical system according to a second embodiment of the present invention taken in the auxiliary scanning direction;

FIG. 12 shows an arrangement of the components of the scanning optical system according to a fifth embodiment of the present invention, taken in the auxiliary scanning direction;

FIG. 13 shows an arrangement of the components of the scanning optical system according to a sixth embodiment of the present invention, taken in the auxiliary scanning direction;

FIG. 14 shows an arrangement of the components of the scanning optical system according to a seventh embodiment of the present invention, taken in the auxiliary scanning direction;

FIG. 15 shows an arrangement of the components of the scanning optical system according to an eighth embodiment of the present invention, taken in the auxiliary scanning direction;

FIGS. 18(A), 18(B) and 18(C) are graphs showing the linearity error, the curvature of field and the bowing of a scanning line, respectively, for the first embodiment illustrated in FIG. 8;

FIGS. 19(A), 19(B) and 19(C) are graphs showing the linearity error, the curvature of field and the bowing of a scanning line, respectively, for a second embodiment of the present invention as illustrated in FIG. 9;

FIGS. 20(A), 20(B) and 20(C) are graphs showing the linearity error, the curvature of field and the bowing of a scanning line, respectively, for a third embodiment of the present invention as illustrated in FIG. 10;

FIGS. 21(A), 21(B) and 21(C) are graphs showing the linearity error, the curvature of field and the bowing of a scanning line, respectively, for a fourth embodiment of the present invention as illustrated in FIG. 11;

FIGS. 22(A), 22(B) and 22(C) are graphs showing the linearity error, the curvature of field and the bowing of a scanning line, respectively, for a fifth embodiment of the present invention as illustrated in FIG. 12;

FIGS. 25(A), 25(B) and 25(C) are graphs showing the linearity error, the curvature of field and the bowing of a scanning line, respectively, for an eighth embodiment of the present invention as illustrated in FIG. 15;

DETAILED DESCRIPTION OF THE PREFERRED EMBODIMENTS

In a scanning optical system, a light source such as a semiconductor laser emits a beam of light which scans a scanning surface along a predetermined scanning direction. While being scanning along the predetermined scanning direction, the scanning surface is moved, relative to the position where the beam of light from the semiconductor laser scans, in a direction perpendicular to the predetermined scanning direction. Thus, the scanning surface is scanned two dimensionally.

In the following description, the predetermined scanning direction is referred to as the main scanning direction or main scanning section, and the direction of relative movement of the scanning surface is referred to as the subscanning direction, auxiliary scanning direction or auxiliary scanning section.

Figure 1:
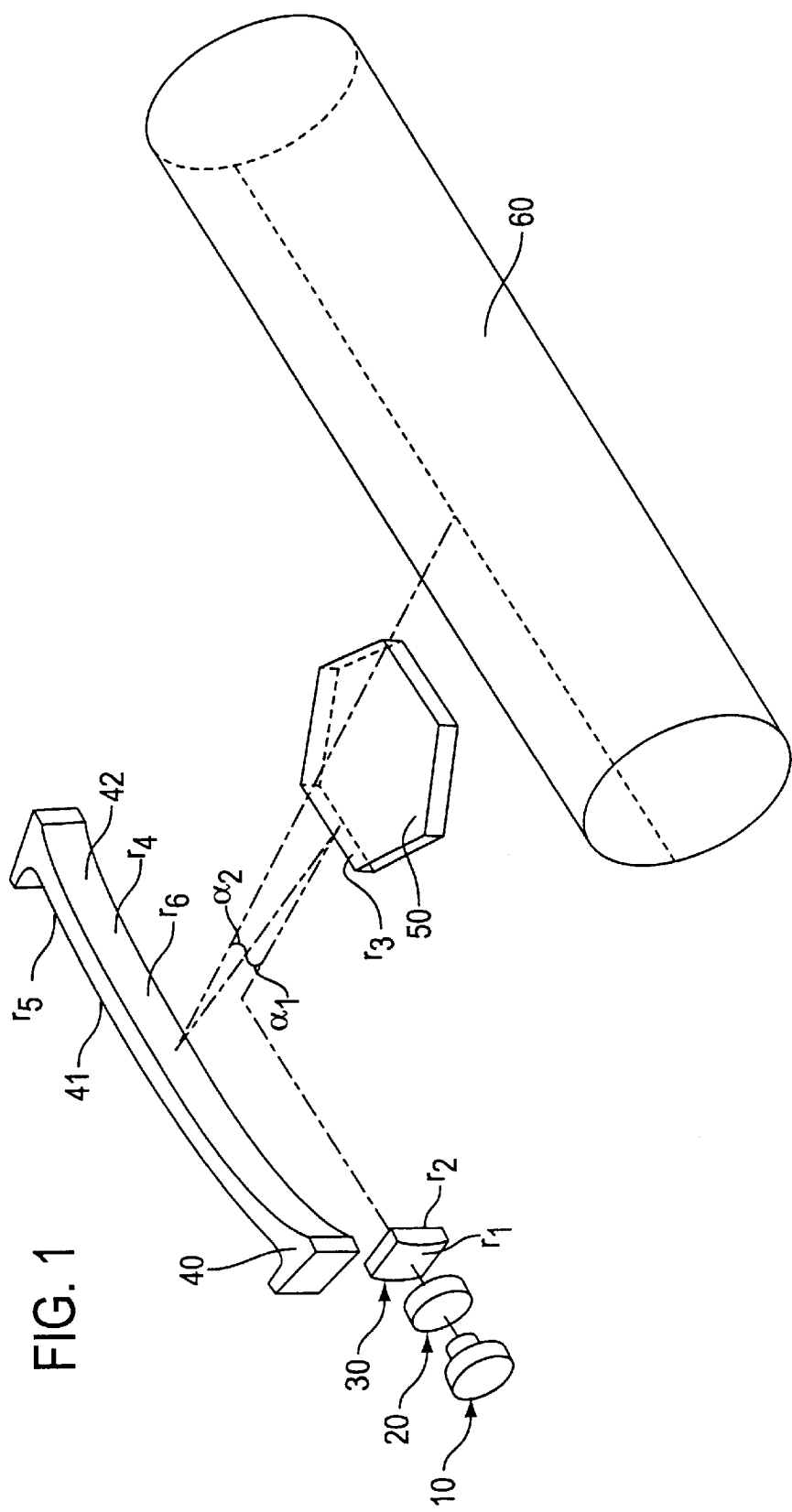
FIG. 1 illustrates, in schematic perspective drawing form, a laser scanning unit according to the features of the present invention.

With particular reference to FIG. 1, a schematic perspective view of the scanning optical system of the present invention is shown.

In particular, the light source 10 emits a beam of light. The light source 10 can be semiconductor laser or the like.

The beam of light emitted from the light source 10 is incident onto and passes through a collimating optical element 20 and is then made incident onto and passes through an optical element 30. The collimating optical element 20 serves to shape the beam of light emitted by the light source 10. In particular, the collimating lens 20 can make the beam of light from the light source into a parallel beam of light.

The optical element 30, according to several embodiments of the present invention, can be a cylindrical lens which serves to converge the beam of light onto a rotating deflector element in an auxiliary scanning section. In other embodiments of the present invention, the optical element 30 is not a cylindrical lens but has a different shape as will be set forth hereinbelow.

According to a significant feature of the present invention, in the main scanning direction, the light incident onto a deflector mechanism is either divergent or parallel light. Specifically, the light incident onto the deflector in the main scanning direction is not convergent light. In other words, the lens 30 in FIG. 1 does not yield a convergent light beam in the main scanning direction. Thus, convergence of the light beam onto the scanning surface is performed by the mirror surface of the fθ lens 40.

In particular, if surfaces r1 and r2 of lens element 30 have a concave curvature in the main scanning direction, the light transmitted therethrough will be a divergent light beam. On the other hand, if surfaces 1 and 2 do not have a radius of curvature in a main scanning direction (i.e., lens element 30 is a cylindrical lens), the light beam transmitted therethrough will emerge as a parallel light beam in the main scanning direction.

Light from the optical element 30 is directed to and made incident onto a rotating light deflecting member or mechanism 50. The light deflecting member 50 can be in the shape of a polygonal mirror which is rotated about the axis AX (FIG. 3) by an appropriate driving mechanism, such as a motor (not shown). The light beam from the optical element 30 can be directed towards the deflecting element either directly, or can be indirectly made incident thereto, such as by means of one or more reflectors.

Although as illustrated in FIG. 1 the deflecting member 50 is shown to be a polygonal mirror, it is contemplated (and within the scope of the present invention) that other deflecting mechanisms can be used in the present invention such as, e.g, a hologram disk or a similar mechanism.

Light reflected from the polygonal mirror 50 is directed towards and made incident onto the fθ reflective/refractive element 40 which is a significant feature of the present invention. The fθ element 40 has front and rear side surfaces 42 and 41.

In particular, light reflected from the light deflecting device 50 (rotating mirror) to be incident onto the fθ reflective/refractive element 40 is first made incident onto a front side refractive surface 42, and is then transmitted through the element 40 and is reflected by a rear side reflective surface 41 at the opposite side of the optical element 40. From the reflective surface 41, the beam of light is again transmitted through the fθ reflective/refractive element and is emitted through the refractive surface 42. Thus, the fθ reflective/refractive element 40 of the present invention performs the function of three surfaces. In other words the fθ element 40 performs two refractions (at surface 42) and one reflection (at surface 41) of the light beam incident thereto.

After being emitted by the surface 42, the light beam is made incident onto the photosensitive surface, which can be a drum 60. The drum 60 is a photosensitive drum which serves as a scanning surface. As previously noted, in the scanning optical system according to the present invention, the beam of light from the, e.g., semiconductive laser, scans a scanning surface two-dimensionally. With reference to FIG. 1, scanning in the predetermined or in the main scanning direction or section is performed by rotation of the light deflecting member 50 while scanning in the subscanning or auxiliary direction is performed by the rotation of the photosensitive drum 60 by an appropriate mechanism (not shown).

As previously mentioned, reflective/refractive fθ element 40 is a significant feature of the present invention. Accordingly, it will now be discussed in greater detail.

As will be set forth hereinafter with respect to the various specific embodiments of the present invention, the front and back surfaces of the fθ optical element 40 have predetermined aspherical shapes. In this regard, when referring herein to the front surface of element 40, the refractive surface 42 is intended and when referring to the back or rear surface of element 40, the reflective surface 41 is intended. Light is both incident onto and emitted from front surface 42.

It is a significant feature of the present invention that both surfaces 41 and 42 of the element 40 are formed as aspherical surfaces and that one of these surfaces is provided with a reflective coating to form a reflective surface.

The reflective coating provided on rear surface 41 of fθ element 40 can be either an aluminized, silvered or any other type of reflecting surface formed thereon by conventional manufacturing techniques such as, e.g., by vapor deposition or any other appropriate process.

FIGS. 4–7 illustrate various types of aspherical surfaces which can be utilized in various combinations (as will be set forth hereinbelow with respect to the particular embodiments of the present invention) to form the front and back surfaces of the reflective/refractive fθ element 40, which is a significant feature of the present invention. In these figures, the solid lines represent the surface while the broken lines relate to the generation of the surface, as will be explained below for each surface of FIGS. 4–7.

FIGS. 4–7 also show the main scanning direction, which is referred to in the present application as the Y direction, and the auxiliary scanning direction, which is referred to in the present application as the Z direction.

Figure 4:
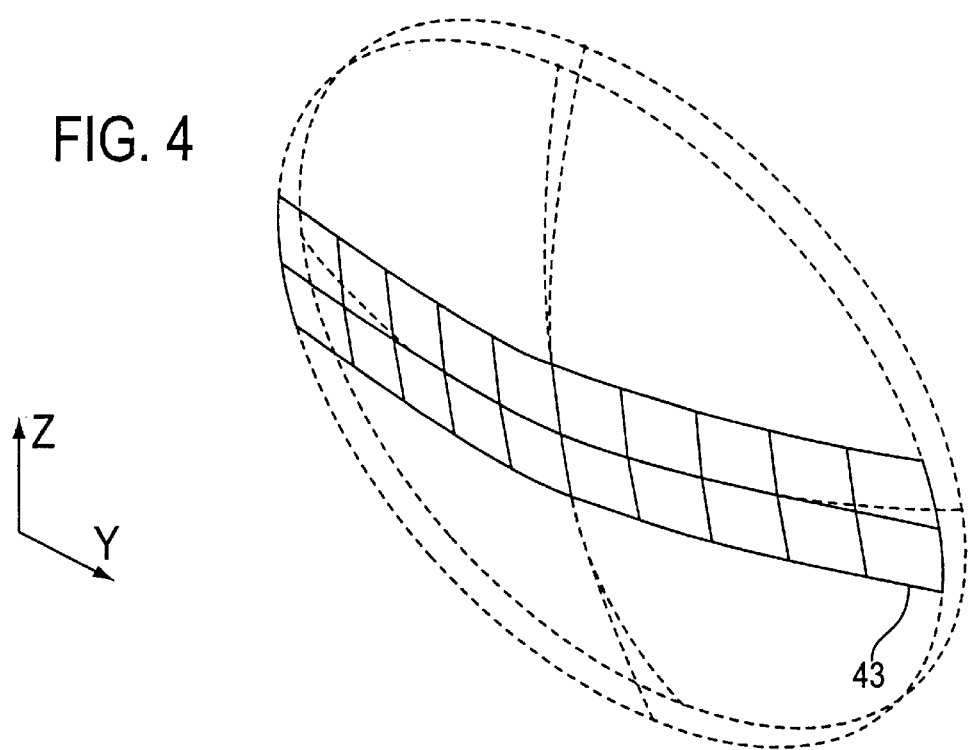
FIG. 4 shows an aspherical surface, which is utilized in various embodiments of the present invention.

FIG. 4 shows a rotationally symmetrical aspherical surface 43. As used herein, a rotationally symmetrical aspherical surface is a surface defined by a locus formed by the rotation of a non-circular curved line extending in the main scanning direction, about an axis along the optical axis of the instant scanning optical system. A rotationally symmetrical aspherical surface can readily be fabricated such as by a lathe.

In contradistinction to the above, the more complex surface as will be described below cannot be manufactured by a lathe, because they do not have an axis of rotation. (In other words, the rotationally symmetrical aspherical surface shown in FIG. 4 is symmetrical in the Y and Z planes.)

An aspherical surface of the type shown in FIG. 4 is defined by the following equations:

$$x = \frac{Ch^2}{1 + (1 - (1+K)C^2h^2)^{1/2}} + A4h^4 + A6h^6 + A8h^8 + \ldots \quad (1)$$

and $$h = (y^2 + z^2)^{1/2} \quad (2)$$

where
x represents a distance from a tangent plane of an aspherical vertex;
h represents a distance from the optical axis of the aspherical surface;
C represents a curvature (1/r) of the aspherical surface;
K is a conic constant; and
A4,A6,A8, . . . are aspherical coefficients of each order (i.e., A4 is the fourth-order aspherical coefficient, etc.).

Figure 5:
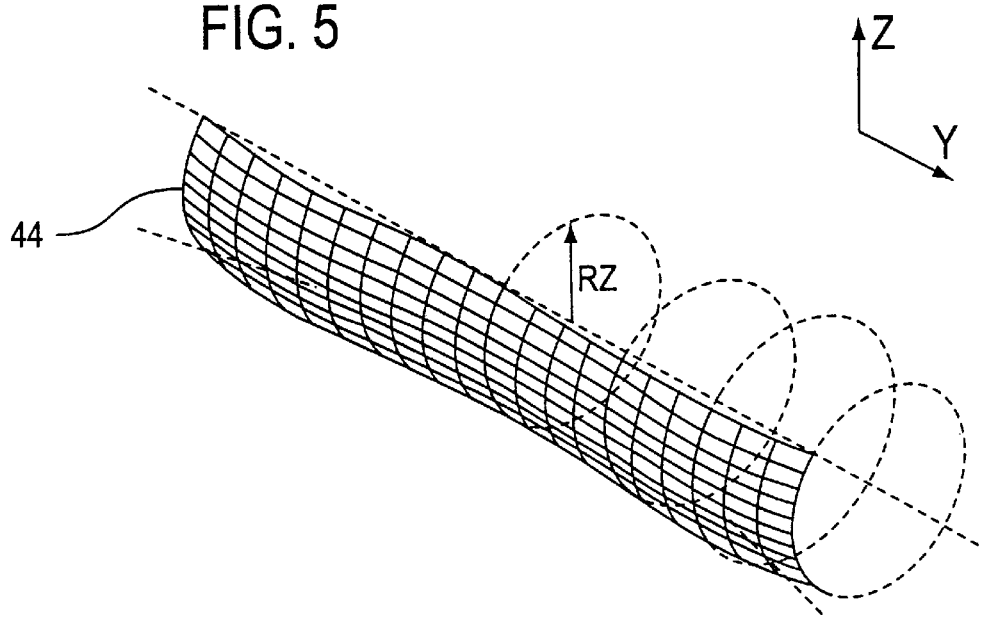
FIG. 5 shows a toric aspherical surface which is utilized in various embodiments of the present invention.

FIG. 5 shows a toric aspherical surface 44. A toric aspherical surface is a surface defined by a locus formed by the rotation of a non-circular curved line extending in the main scanning direction, about an axis parallel to the main scanning direction. (Such a surface, as is shown in FIG. 5, only exhibits symmetry in the Y plane, not in the Z plane.)

In the main scanning direction, the aspherical surface of this type is defined by the following equation:

$$x = \frac{Cy^2}{1 + (1 - (1+K)C2y2)^{1/2}} + A4y^4 + A6y^6 + A8y^8 + \ldots \quad (3)$$

where y represents a distance from the optical axis of the aspherical surface in the main scanning direction. C,K, A4A6, representing the curvature, conic constant and the aspherical coefficients for each order, and have the same definitions as for the rotationally symmetrical aspherical surface discussed above with respect to FIG. 4. For the shape shown in FIG. 5, a radius of curvature in the auxiliary scanning direction is defined as rz.

Figure 6:
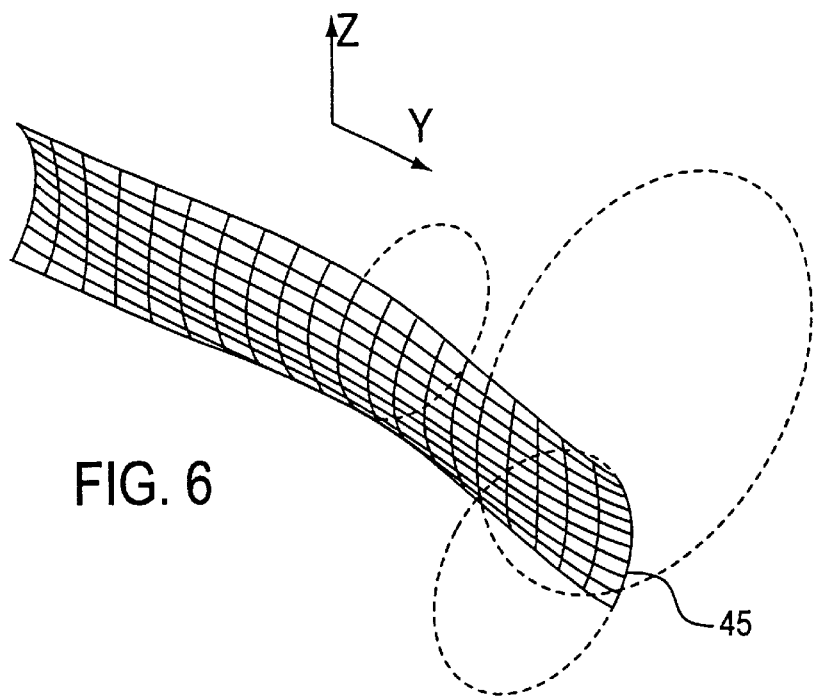
FIG. 6 shows an advanced anamorphic aspherical surface which is utilized in various embodiments of the present invention.
Figure 7:
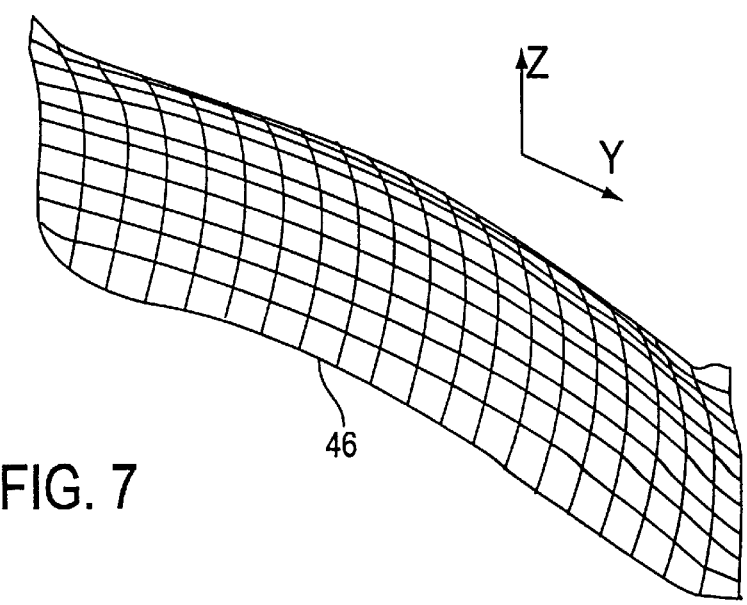
FIG. 7 shows a two-dimensional polynomial aspherical surface which is utilized in various embodiments of the present invention.

As noted above, FIGS. 4 and 5 show a aspherical surfaces which have rotational axis. FIGS. 6–7, to be discussed individually hereinbelow, show aspherical surfaces which have no rotational axis and which are not rotationally symmetrical about the optical axis O. Thus, since these surface shapes have no rotational axis, the surfaces defined thereby must be produced by a process of point-by-point mapping and cannot be fabricated by a rotation based process, i.e., by the use of a lathe. These are thus considered to be more complex shapes. Each of these surfaces is individually defined hereinbelow.

FIG. 6 shows an advanced anamorphic aspherical surface 45. As used herein, an advanced anamorphic aspherical surface is defined as formed by a locus of the movement of a variable circular arc extending in the auxiliary scanning direction and moving in a direction along a non-circular curved line extending in the main scanning direction.

In the main scanning direction, an advanced anamorphic aspherical surface of this type is defined by the following equation:

$$x = \frac{Cy^2}{1 + (1 - (1+K)C^2y^2)^{1/2}} + AM2y^2 + AM4y^4 + AM6y^6 + \ldots \quad (4)$$

where y is a distance from the optical axis of the aspherical surface in the main scanning direction, C is a curvature (1/r) of the aspherical surface, K is a conic constant and AM2,AM4,AM6, . . . are aspherical coefficients of each order to define the curvature in the main scanning direction.

In the auxiliary scanning direction, a curvature of the advanced anamorphic aspherical surface is defined by the following equation:

$$Cz(y) = Cz0 + AS2 \cdot y^2 + AS4 \cdot y^4 + AS6 \cdot y^6 + \ldots \quad (5)$$

where Cz(Y) is a curvature in the auxiliary scanning direction at the point where the distance from the optical axis is Y in the main scanning direction. Cz0 is equal to 1/rz. AS2,AS4,AS6, . . . are aspherical coefficients of each respective order to define the curvature in the auxiliary scanning direction.

FIG. 7 shows a two-dimensional polynomial aspherical surface 46. As used herein, a two-dimensional polynomial aspherical surface is a surface defined by (i.e., is represented as the function of) a two-dimensional polynomial expression. Such a surface is defined by the following relationship:

$$x = f(y, z) \qquad (6)$$
$$= \frac{c(y^2 + z^2)}{1 + (1 - (K+1)c^2(y^2 + z^2))^{1/2}} + \sum_{n=0}\sum_{m=0} B_{m,n} \cdot y^m \cdot z^n$$

where y and z are distances from the optical axis in the main and the auxiliary scanning direction, respectively. C is a curvature (1/r) of the aspherical surface and K is a conic constant, as with respect to the previously discussed shapes. $B_{m,n}$ are aspherical coefficients of each order, where m and n identify an order number relating to the y and z directions (i.e., main and auxiliary scanning directions), respectively. In appended Tables 12–18, n values range from 0 to 6, m values range from 0 to 12 while K=0.

As shown in each of FIGS. 4–7, with respect to the present invention, the main scanning direction is the y direction and the auxiliary scanning direction is the z direction.

According to the features of the present invention, while the front side surface of the reflective/refractive fθ element 40 can be any of the above-noted aspherical surfaces shown in FIGS. 4–7, the back side surface of this element must be an aspherical surface which does not have a rotation axis and is not rotationally symmetrical about the optical axis so as to compensate the curvature field in the auxiliary scanning direction. Thus, the back side surface, according to the various embodiments of the present invention can be any of the surfaces illustrated in FIGS. 6 and 7.

According to a further feature of the present invention, the optical axis of the refractive/reflective fθ element 40 is positioned to not be perpendicular to the rotational axis of the light deflecting device. In other words, the fθ element is tilted.

According to yet a further feature of the present invention, the front side and/or back side of the fθ element can be decentered. In other words, the optical axis of the fθ element can be shifted from the optical axis of the scanning system.

As a result of the tilting of the surface of the fθ element, the light passes further from the light deflector and the scanning optical system is thus easier to lay out and design. Furthermore, the decentering of the surface or surfaces of the fθ element enables compensation for bowing of the scan line and wave front aberration.

Figure 2:
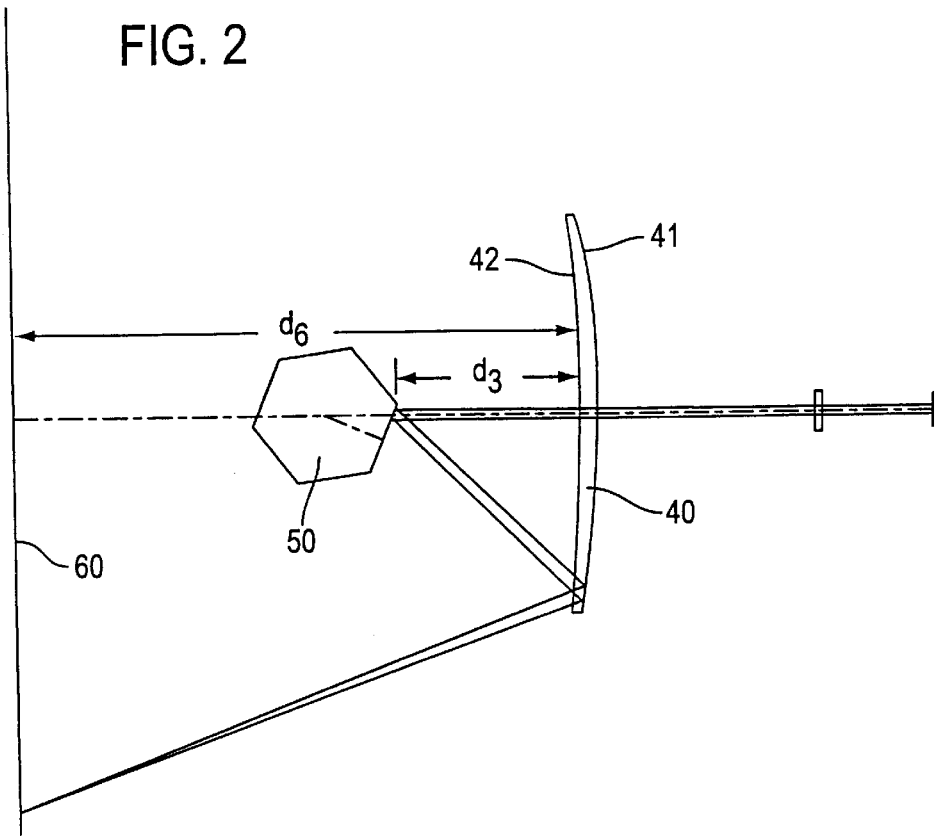
FIG. 2 shows an arrangement of the components of the scanning optical system of the present invention in a main scanning direction.
Figure 3:
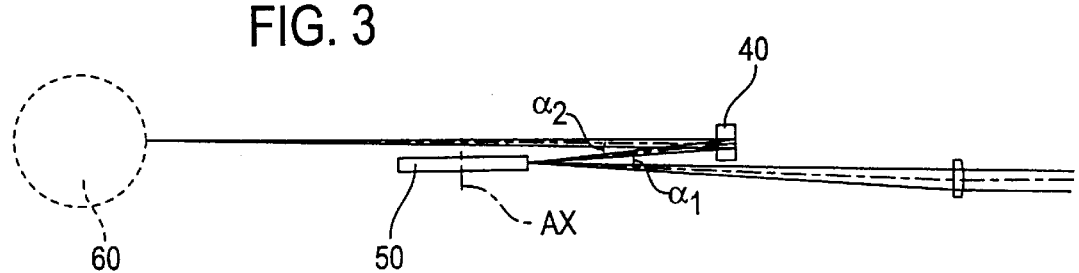
FIG. 3 shows the arrangement of components of the laser scanning optical system of the present invention in an auxiliary scanning direction.

The decentering and the tilting of the fθ optical element of the present invention is illustrated in FIGS. 1–3. In particular, $\alpha_1$ (i.e., the deflection angle in the auxiliary scanning direction) represents the angle between light incident onto the light deflecting element and light reflected from the light deflecting element. Similarly, as can be seen in FIG. 1, $\alpha_2$ (i.e., the separation angle in the auxiliary scanning direction) represents the angle between the light incident onto the fθ element and the light emitted therefrom.

Tilting of the fθ element is utilized to achieve a large deflection angle to enable flexibility in the positioning of the deflecting element (e.g., mirror). Decentering (i.e., displacement or shifting) of a surface with respect to the optical axis, in most cases of the front surface of the fθ element, is utilized to compensate for bow and wave front aberration. Decentering is defined by the distance between light incident (perpendicular to) onto the front surface of the fθ element (i.e., in the untilted position) and the optical axis of the first surface, as can be seen in FIG. 8. Decentering results in a shift of one surface of the fθ element with respect to the other surface of the fθ element. The amount of decentering is obviously determined (in the design stage) prior to manufacture of the fθ element.

With respect to the particular embodiments of the present invention, as will be discussed hereinbelow, $\alpha_1$ represents the deflection angle, $\alpha_2$ represents the separation angle, $\beta_1$ represents the tilt angle, $\beta_2$ represents the tilt of the optical axes with respect to each other, $\delta_{z1}$ represents the decentering of the first surface, and $\delta_{z2}$ represents decentering of the second surface. $\delta_{z2}$ is defined as the distance between the optical axis of the first surface and the optical axis of the second surface.

As previously noted, according to a feature of the present invention, the optical axis of the fθ lens element is not perpendicular to the rotational axis of the light deflecting member. This tilting relationship can be quantitified by the following relationship:

$$\alpha_2/\alpha_1 > 0.50 \qquad (7)$$

where $\alpha_2$ is the angle of separation and $\alpha_1$ is the angle of deflection as discussed above and as illustrated particularly in FIG. 1.

As also noted above, according to the features of the present invention and as a result of the features of the present invention, the layout and design of the optical scanning system is simplified. As a result, the following relationship is also satisfied:

$$0.25 < d3/d6 < 0.40 \qquad (8)$$

where d3 is the distance between the light deflecting member and the refractive surface of the fθ element and d6 is the distance between the refractive surface of the fθ element and the scanned surface 60 as illustrated in FIG. 2.

This relationship (8) indicates that the light incident onto the light deflecting member is divergent or parallel in the main scanning direction. As can be seen from Table 1, each of the embodiments of the present invention satisfies each of the above two relationships (7) and (8).

TABLE 1

| Embodiment | $\alpha_2/\alpha_1$ | d3/d6 |
|---|---|---|
| 1 | 0.799 | 0.345 |
| 2 | 0.773 | 0.304 |
| 3 | 0.854 | 0.325 |
| 4 | 0.928 | 0.379 |
| 5 | 0.869 | 0.305 |
| 6 | 0.556 | 0.293 |
| 7 | 0.930 | 0.325 |
| 8 | 1.914 | 0.378 |
| 9 | 0.940 | 0.379 |
| 10 | 2.110 | 0.310 |

According to a feature of the present invention, the above-described fθ optical element 40 performs the functions of an objective lens. In other words, in prior art optical scanning systems a separate objective (i.e., converging) lens is provided. According to one of the features and advantages of the present invention, a separate objective lens is not required. Rather, the curved mirrored surface of element 40 performs the functions of an objective lens, which serves to converge the beam onto the scanning surface. According to the present invention, in the principal optical plane, light incident onto the deflector 50 is either divergent light or parallel light (as discussed above with respect to lens element 30) and is converged to a point on the scanning surface by the fθ element and particularly by the mirrored surface of optical element 40.

As noted above, in the present invention light incident onto the deflector 50 is not convergent but is either parallel or divergent. If, in the principal optical plane (main scanning direction) light incident onto the light deflecting element 50 is convergent, then the distance between the fθ element 40 and the scanning surface 60 would have to be made very short and would be inadequate to compensate for aberrations. Accordingly, because the present invention does not utilize a convergent light beam incident onto the light deflecting element 50, the space between the scanning surface and the fθ element can be increased to enable compensation for the aberrations because the surface can be made more complex (i.e., as surface not having a rotational axis).

In the auxiliary scanning direction, light incident onto the deflector is converged. If the light incident onto the deflector in the auxiliary scanning direction is parallel, inclination error of the deflector (due to, i.e., manufacturing or assembly errors) would cause the focal point of the light on the scanning surface to be misplaced in the auxiliary scanning direction. On the other hand, if the light incident onto the deflector in the auxiliary scanning direction is converging, the deflecting mirror and the scanning surface are conjugate with each other and therefore no mispositioning of the light on the scanning surface occurs.

Because the light is converged onto the deflector in the auxiliary scanning direction, the pitch resulting from rotation of the photosensitive (i.e., scanning) surface in conjunction with rotation (i.e., the next facet) of the deflector become equal.

Accordingly, according to the teachings and features of the present invention, in the auxiliary scanning section, light is converged onto the deflector, but in the main scanning direction, the light incident onto the deflector is either parallel or divergent.

The fθ element 40 is made of a plastic resin. Ordinarily such plastic resin optical element have an index of refraction which is very sensitive to temperature and humidity changes. However, the fθ element of the present invention does not exhibit such sensitivity since the thickness of the fθ element is relatively small and the power of the refractive surface is small, most of the power of the element being contributed by the reflective surface.

With reference to FIGS. 8–17, ten specific embodiments of the present invention are shown with the views in each figure being taken in the auxiliary scanning direction. Correspondingly, FIGS. 18–27 show various aberrations for each of the described embodiments. In particular, FIGS. 18(A)–27(A) show fθ characteristic (i.e., linearity error), FIGS. 18(B)–27(B) show curvature of field, and FIGS. 18(C)–27(C) show bowing of the scan line for each of the embodiments set forth in FIGS. 8–17. In FIGS. 18(B)–27(B), the result of measurement of the curvature of field in the scanning optical system are shown, in the meridional section M (i.e., main scanning direction) and in the sagittal section S (i.e., auxiliary scanning direction).

In each of these figures, the vertical axis shows position in the main scanning direction Y. In FIGS. 18(A)–27(A) and 18(C)–27(C), the horizontal axis shows displacement of image height with respect to the ideal image height (mm). In FIGS. 18(B)–27(B), the horizontal axis shows displacement of the focal point with respect to the ideal image plane (mm).

Specific numerical values for various parameters of each of the first through tenth embodiments are set forth below.

In Tables 2–11, ry refers to a radius of curvature of a particular identified lens surface along the main scanning direction y and rz refers to a radius of curvature of each identified lens surface along the auxiliary scanning direction z. A thickness of a lens or a distance between lens surfaces is represented by d while n represents a refractive index of an optical element with respect to a wave length of 780 mm. Distances d3 and d6 are shown in FIG. 2. Distance d1 represents the thickness of the element 30, while d2 represents the distance between the deflector 50 and the lens 30.

In Tables 2–11, surfaces 1 and 2 refer to the lens 30 which may or may not be a cylindrical lens according to the various embodiments of the present invention as will be set forth for each specific embodiment. Surface 3 refers to the facet of the light deflecting device (e.g., rotating mirror 50). Surface 4 refers to the front surface 42 of the fθ element, surface 5 refers to the rear surface of the fθ element and surface 6 again refers to the front surface of the fθ element through which the light beam, having been refracted through the element 40, reflected by the surface 41, and then refracted again through the element 40 is emitted towards the photosensitive drum 60. As noted above these surfaces are identified in FIG. 1 as $r_1$–$r_6$ but have not been specifically identified in FIGS. 8–17 relating to the specific embodiments in order to maintain the clarity of the drawings.

Tables 2–11 also provide values of the deflection and separation angles discussed above for each specific embodiment. Similarly, values for the tilt and decentering of the surfaces of the fθ element 40 are also provided for each specific embodiment. As shown in FIG. 1, as well as in FIGS. 8–17, angle α1 is the deflection angle between a beam incident onto the light deflecting device 50 and a beam reflected therefrom. Angle α2 represents the separation angle between a beam incident onto the fθ element 40 and a beam emitted therefrom towards the photosensitive drum 60. Angle β1 represents the tilt of the front surface of the fθ element 40 while angle β2 represents the tilt of the optical axes of the front and rear surfaces of the fθ element with respect to each other. δz1 represents the decentering of the first or front surface of the fθ element and δz2 represents the decentering between the optical axes of the first (or front) and second (or back) surfaces of the fθ element.

First Embodiment

The first structural embodiment of the present invention is shown in FIG. 8 and the aberrations with respect thereto are shown in FIGS. 18(A), 18(B) and 18(C). The first embodiment is characterized by a front surface 42 which is a rotationally symmetrical aspherical surface such as that illustrated in FIG. 4 while the back surface 41 of the fθ element is a two-dimensional polynomial aspherical surface such as is shown in FIG. 7. In the first embodiment, the lens 30 is not a cylindrical lens.

In the first embodiment, the fθ element is tilted as indicated by a value for β1. Also, the first surface is decentered as indicated by the value for δz1. However, the second surface is coaxial with the first surface and is thus not considered to be decentered, as this term is utilized in the present application, and accordingly, no value is given for δz2.

TABLE 2

| Surface # | | ry | rz | d | n |
|---|---|---|---|---|---|
| 1 | | −217.132 | 55.424 | 2.000 | 1.48617 |
| 2 | | Inf. | — | 113.000 | |
| 3 | | Inf. | — | 50.000 | |
| 4 | | −1559.357 | | 5.000 | 1.48617 |
| 5 | | −330.228 | see table 12 | (5.000) | (1.48617) |
| 6 | | (−1559.357) | — | 145.033 | |
| α1 | 8.00° | | | | |
| α2 | 6.39° | | | | |
| β1 | 7.00° | δz1 | | −4.87 | |
| β2 | | δz2 | | | |

As noted above, front surface 42 is a rotationally symmetrical aspherical surface such as is shown in FIG. 4. The aspherical surface data defined with respect to relations (1) and (2) are as follows:

$$K = 0.$$
$$A4 = 8.12384 \times 10^{-10}$$
$$A6 = 1.92859 \times 10^{-13}$$
$$A8 = -1.27201 \times 10^{-14}$$
$$A10 = -5.18628 \times 10^{-20}$$

As also noted above, the back surface 41 side is a two-dimensional polynomial aspherical surface with coefficients (Bm,n values) defined with respect to relation (6) as shown in Table 12.

Second Embodiment

The second embodiment of the present invention is illustrated in FIG. 9 and the aberrations with respect thereto are illustrated in FIGS. 19(A), 19(B) and 19(C). For the second embodiment, the front side surface of the fθ element 40 is an advanced anamorphic aspherical surface such as is shown in FIG. 6 while the back side surface of the fθ element is a two-dimensional polynomial aspherical surface as illustrated in FIG. 7. Thus, in the second embodiment, both surfaces of the fθ element have no rotational axis.

As with the first embodiment, lens element 30 is not a cylindrical lens, and the tilt of the fθ element for the second embodiment is the same as for the first embodiment. On the other hand, while in the first embodiment the first surface 42 was decentered, in the second embodiment, the second surface 41 of the fθ element is decentered as indicated by the value for δz2. Decentering of the second surface is defined by the distance between the optical axis of the first surface and the optical axis of the second surface of the fθ lens.

TABLE 3

| Surface # | | ry | rz | d | n |
|---|---|---|---|---|---|
| 1 | | −52.418 | 55.424 | 2.000 | 1.48617 |
| 2 | | Inf. | — | 113.000 | |
| 3 | | Inf. | — | 50.000 | |
| 4 | | −281.513 | −254.458 | 5.000 | 1.48617 |
| 5 | | −229.424 | see table 13 | (5.000) | (1.48617) |
| 6 | | (−281.513) | (−254.458) | 167.730 | |
| α1 | 8.00° | | | | |

TABLE 3-continued

| Surface # | | ry | rz | d | n |
|---|---|---|---|---|---|
| α2 | 6.39° | | | | |
| β1 | 7.00° | δz1 | | | |
| β2 | | δz2 | | −4.49 | |

As noted above, the front surface 42 is an advanced anamorphic aspherical surface such as in shown in FIG. 6. The aspherical surface data thereof is defined with respect to relations (4) and (5) and is as follows:

$$K = 0.$$
$$AM2 = 5.18173 \times 10^{-4} \quad AS2 = 1.99264 \times 10^{-8}$$
$$AM4 = 2.01506 \times 10^{-10} \quad AS4 = -1.11067 \times 10^{-11}$$
$$AM6 = -2.13271 \times 10^{-11} \quad AS6 = -7.87229 \times 10^{-15}$$
$$AM8 = -7.47388 \times 10^{-18} \quad AS8 = 5.51440 \times 10^{-17}$$
$$AM10 = 8.20005 \times 10^{-21}$$
$$AM12 = 2.59115 \times 10^{-25}$$

As noted above, the back surface 41 of the fθ element 40 according to the second embodiment is a two-dimensional polynomial aspherical surface with coefficients as shown in Table 13.

Third Embodiment

Figure 10:
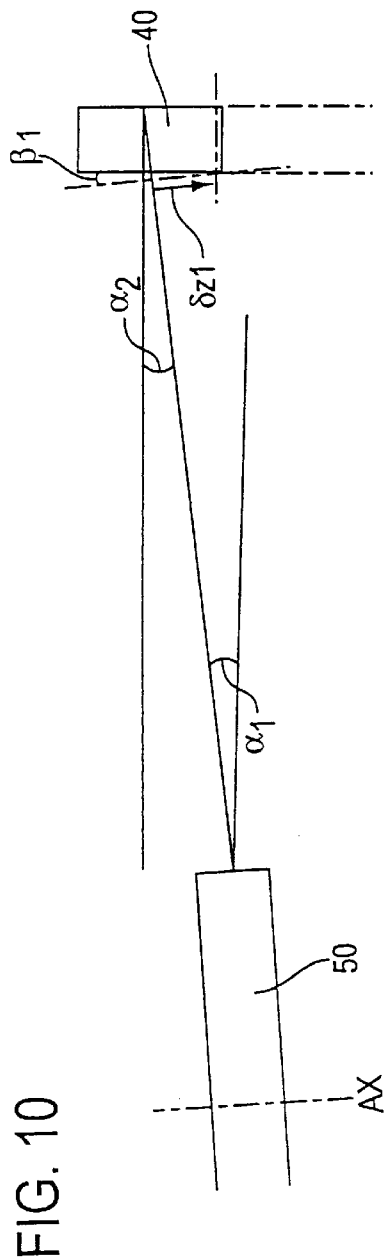
FIG. 10 shows an arrangement of the components of the scanning optical system according to a third embodiment of the present invention, taken in the auxiliary scanning direction.

The third embodiment of the present invention is shown in FIG. 10 and the aberrations with respect thereto are shown in FIGS. 20(A), 20(B) and 20(C). The third embodiment of the present invention utilizes an fθ element wherein the front side surface is a toric aspherical surface such as shown in FIG. 5 while the rear side surface is a two-dimensional polynomial aspherical surface as is shown in FIG. 7.

In the third embodiment, the lens element 30 is not a cylindrical lens element. The tilt of the fθ element in the third embodiment is the same as that in the first embodiment and the decentering of the first surface is substantially the same as in the first embodiment. Also, similarly to the first embodiment, the second surface is coaxial with the first surface and accordingly is not considered to be decentered with respect thereto.

TABLE 4

| Surface # | | ry | rz | d | n |
|---|---|---|---|---|---|
| 1 | | −107.114 | 55.424 | 2.000 | 1.48617 |
| 2 | | Inf. | — | 113.000 | |
| 3 | | Inf | — | 50.000 | |
| 4 | | −656.665 | Inf. | 5.000 | 1.48617 |
| 5 | | −286.043 | see table 14 | (5.000) | (1.48617) |
| 6 | | (−656.665) | Inf. | 159.933 | |
| α1 | 8.00° | | | | |
| α2 | 6.83° | | | | |
| β1 | 7.00° | δz1 | | −4.64 | |
| β2 | | δz2 | | | |

As noted above, for the third embodiment, the front surface 42 is a toric aspherical surface such as is shown in FIG. 5. The aspherical surface data for such a surface is defined with respect to relation (3) and is as follows:

K = 0.
A4 = 6.26694 × $10^{-10}$
A6 = 1.78997 × $10^{-13}$
A8 = −1.28024 × $10^{-14}$
A10 = −4.07921 × $10^{-21}$

As noted above, the back or rear side surface 41 of the fθ element of the third embodiment is a two-dimensional polynomial aspherical surface with coefficients as shown in Table 14.

Fourth Embodiment

Figure 11:
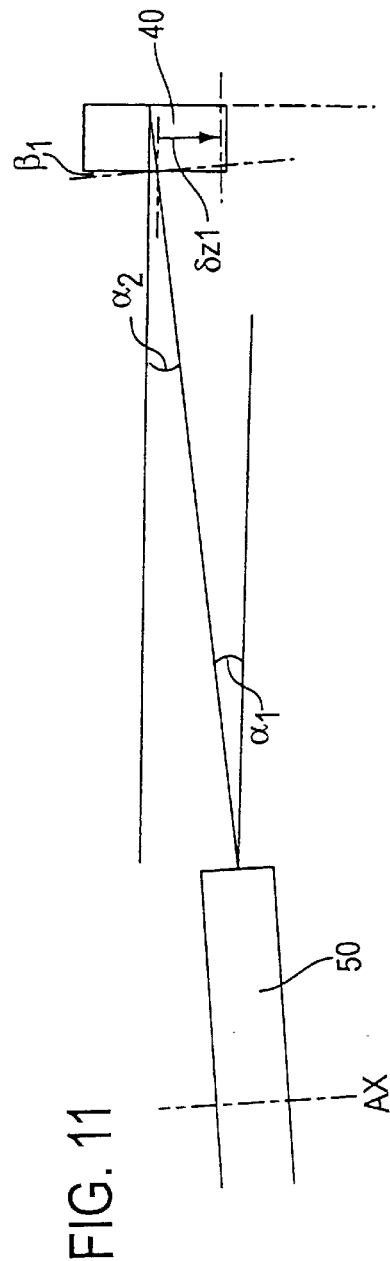
FIG. 11 shows an arrangement of the components of the scanning optical system according to a fourth embodiment of the present invention, taken in the auxiliary scanning direction.

The fourth embodiment of the present invention is shown in FIG. 11 and the aberrations with respect thereto are shown in FIGS. 21(A), 21(B) and 21(C). The fourth embodiment of the present invention utilizes an fθ element wherein the front side surface is an advanced anamorphic aspherical surface such as is shown in FIG. 6 and the rear side surface is also an advanced anamorphic aspherical surface as is shown in FIG. 6. Thus, both surfaces of the fθ element have no rotational axis and are not rotationally symmetrical about an optical axis.

In the fourth embodiment, the lens element 30 is a cylindrical lens element as evidenced by the ry values for surfaces 1 and 2. The tilt of the fθ element in the fourth embodiment is the same as that in the third embodiment and the decentering of the second surface is indicated by δz2. The first surface 42 is not decentered.

TABLE 5

| Surface # | | ry | rz | d | n |
|---|---|---|---|---|---|
| 1 | | Inf. | 55.424 | 2.000 | 1.48617 |
| 2 | | Inf. | — | 113.000 | |
| 3 | | Inf. | — | 50.000 | |
| 4 | | −252.156 | −5529.597 | 5.000 | 1.48617 |
| 5 | | (−266.020) | −114.190 | (5.000) | (1.48617) |
| 6 | | (−252.156) | (−5529.597) | 131.925 | |
| α1 | 8.00° | | | | |
| α2 | 7.42° | | | | |
| β1 | 7.00° | δz1 | | | |
| β2 | | δz2 | −4.00 | | |

As noted above, for the fourth embodiment, the front side surface 42 is an advanced anamorphic surface such as is shown in FIG. 6. The aspherical surface data for such a surface is defined with respect to relations (4) and (5) and is as follows:

K = 0.
AM2 = 2.73084 × $10^{-3}$     AS2 = 1.05152 × $10^{-6}$
AM4 = 1.76006 × $10^{-9}$     AS4 = −5.59027 × $10^{-11}$
AM6 = −7.69198 × $10^{-11}$   AS6 = −1.90473 × $10^{-14}$
AM8 = 1.21746 × $10^{-15}$    AS8 = −3.38685 × $10^{-18}$
AM10 = 1.19431 × $10^{-18}$
AM12 = 6.37625 × $10^{-23}$

As noted above, the back side surface 41 of the fθ element of the fourth embodiment is also an advanced anamorphic aspherical surface with aspherical coefficients (with respect to relations (4) and (5) which define the surface) as follows:

K = 0.
AM2 = 8.71462 × $10^{-4}$     AS2 = 8.33356 × $10^{-7}$
AM4 = 3.44863 × $10^{-8}$     AS4 = 2.20100 × $10^{-11}$
AM6 = −2.52132 × $10^{-11}$   AS6 = −4.32275 × $10^{-14}$
AM8 = −8.42513 × $10^{-1}$    AS8 = 4.50414 × $10^{-18}$
AM10 = 9.53281 × $10^{-20}$
AM12 = 1.12246 × $10^{-22}$

Fifth Embodiment

The fifth embodiment of the present invention is shown in FIG. 12 and the aberrations with respect thereto are shown in FIGS. 22(A), 22(B) and 22(C). The fifth embodiment of the present invention utilizes an fθ element wherein the front side surface is a two-dimensional polynomial aspherical surface such as shown in FIG. 7 while the rear side surface is an advanced anamorphic aspherical surface as is shown in FIG. 6.

In the fifth embodiment, the lens element 30 is not a cylindrical lens element. the tilt of the fθ element in the fifth embodiment is the same as that in the previous embodiments and the decentering of the second surface is identified by the value of δz2.

TABLE 6

| Surface # | | ry | rz | d | n |
|---|---|---|---|---|---|
| 1 | | −54.731 | 55.424 | 2.000 | 1.48617 |
| 2 | | Inf. | — | 113.000 | |
| 3 | | Inf. | — | 50.000 | |
| 4 | | −387.121 | see table 15 | 5.000 | 1.48617 |
| 5 | | −247.597 | −114.901 | (5.000) | (1.48617) |
| 6 | | (−387.121) | (see table 15) | 164.063 | |
| α1 | 8.00° | | | | |
| α2 | 6.95° | | | | |
| β1 | 7.00° | δz1 | | | |
| β2 | | δz2 | −4.36 | | |

As noted above, the front surface 42 of the fθ element of the fifth embodiment is a two-dimensional polynomial aspherical surface with coefficients as shown in Table 15.

As noted above, for the fifth embodiment, the back side surface is an advanced anamorphic aspherical surface such as is shown in FIG. 6. The ashperical surface data for such a surface is defined with respect to relations (4) and (5) and is as follows:

K = 0.
AM2 = 2.13467 × $10^{-5}$     AS2 = 5.54000 × $10^{-7}$
AM4 = 3.52190 × $10^{-8}$     AS4 = 4.46124 × $10^{-11}$
AM6 = −8.10277 × $10^{-12}$   AS6 = −1.03512 × $10^{-14}$
AM8 = 3.95297 × $10^{-16}$    AS8 = 7.35969 × $10^{-18}$
AM10 = −3.17849 × $10^{-19}$
AM12 = 8.13935 × $10^{-23}$

Sixth Embodiment

Figure 23A:
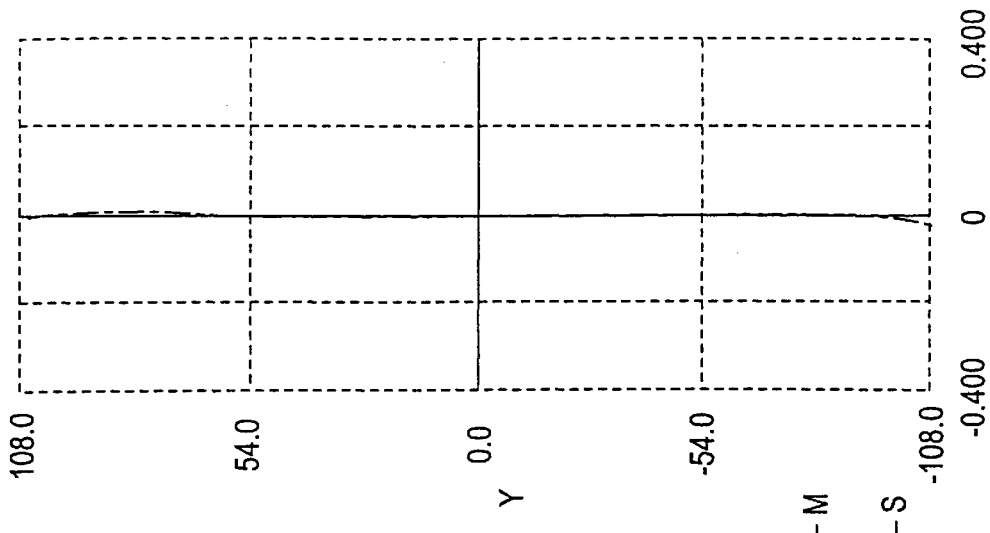
FIGS. 23(A), 23(B) and 23(C) are graphs showing the linearity error, the curvature of field and the bowing of a scanning line, respectively, for a sixth embodiment of the present invention as illustrated in FIG. 13.
Figure 23B:
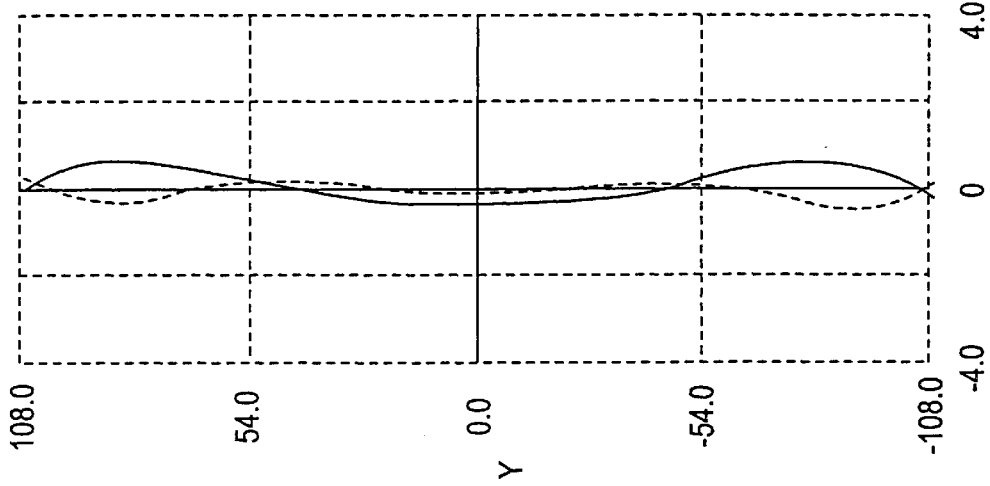
Figure 23C:
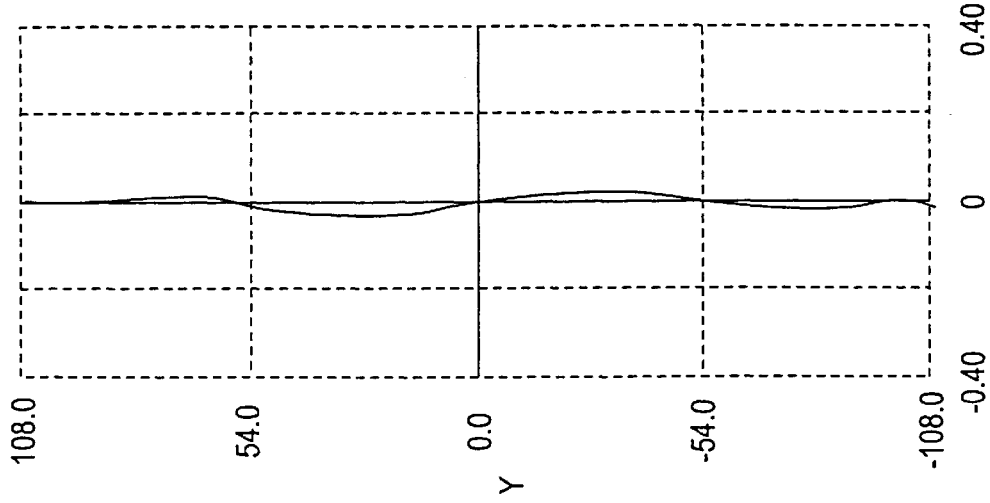

The sixth embodiment of the present invention is shown in FIG. 13 and the aberrations with respect thereto are shown in FIGS. 23(A), 23(B) and 23(C). The sixth embodiment of the present invention utilizes an fθ element wherein the front side surface is a toric aspherical surface such as shown in FIG. 5 while the rear side surface is an advanced anamorphic aspherical surface as is shown in FIG. 6.

In the sixth embodiment, the lens element 30 is not a cylindrical lens element. The tilt of the fθ element in the sixth embodiment is the same as that in the previous embodiments and both the first and second surfaces are decentered as indicated by the values of δz1 and δz2.

TABLE 7

| Surface # | | ry | rz | d | n |
|---|---|---|---|---|---|
| 1 | | −40.172 | 55.424 | 2.000 | 1.48617 |
| 2 | | Inf | — | 113.000 | |
| 3 | | Inf. | — | 50.000 | |
| 4 | | −346.631 | −2095.046 | 5.000 | 1.48617 |
| 5 | | −238.517 | −123.434 | (5.000) | (1.48617) |
| 6 | | (−346.631) | (−2095.046) | 170.442 | |
| α1 | 8.00° | | | | |
| α2 | 4.45° | | | | |
| β1 | 7.00° | δz1 | −15.92 | | |
| β2 | | δz2 | 9.22 | | |

As noted above, for the sixth embodiment, the front surface 42 is a toric aspherical surface such as is shown in FIG. 5. The aspherical surface data for such a surface are defined with respect to relation (3) and are as follows:

$$K = 4.5515$$
$$A4 = 2.18605 \times 10^{-10}$$
$$A6 = -3.31349 \times 10^{-11}$$
$$A8 = -2.46991 \times 10^{-18}$$
$$A10 = -1.61946 \times 10^{-21}$$
$$A12 = 3.59645 \times 10^{-22}$$

As noted above, the back surface 41 of the fθ element of the sixth embodiment is an advanced anamorphic aspherical surface with coefficients, defined with respect to relations (4) and (5), as shown below.

$$K = 0.$$
$$AM2 = -7.04104 \times 10^{-6} \quad AS2 = 2.61525 \times 10^{-7}$$
$$AM4 = 3.06250 \times 10^{-8} \quad AS4 = 3.11371 \times 10^{-12}$$
$$AM6 = -1.28290 \times 10^{-11} \quad AS6 = -1.34317 \times 10^{-14}$$
$$AM8 = -2.72807 \times 10^{-16} \quad AS8 = 2.21227 \times 10^{-18}$$
$$AM10 = -5.39390 \times 10^{-20}$$
$$AM12 = 1.37244 \times 10^{-22}$$

Seventh Embodiment

Figure 24C:
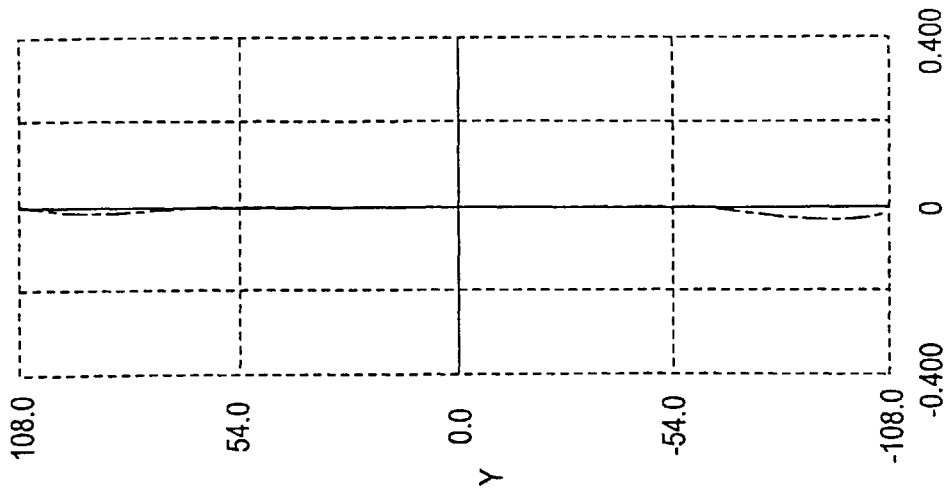
FIGS. 24(A), 24(B) and 24(C) are graphs showing the linearity error, the curvature of field and the bowing of a scanning line, respectively, for a seventh embodiment of the present invention as illustrated in FIG. 14.
Figure 24B:
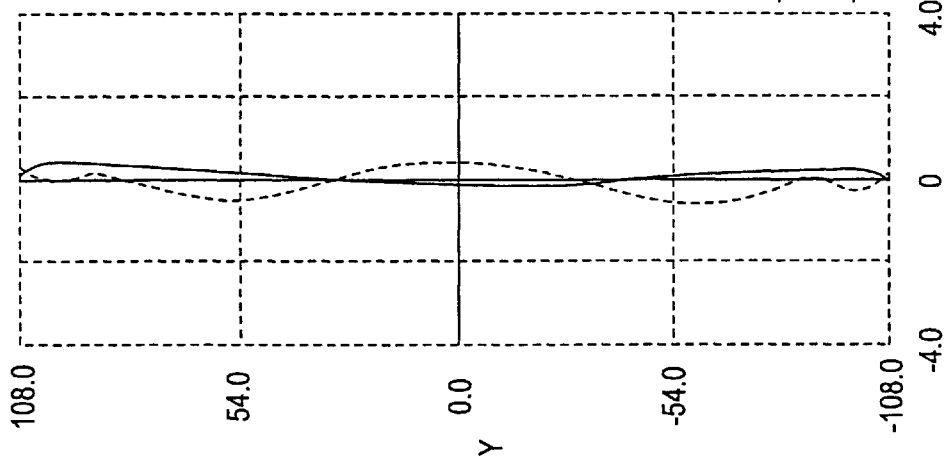
Figure 24A:
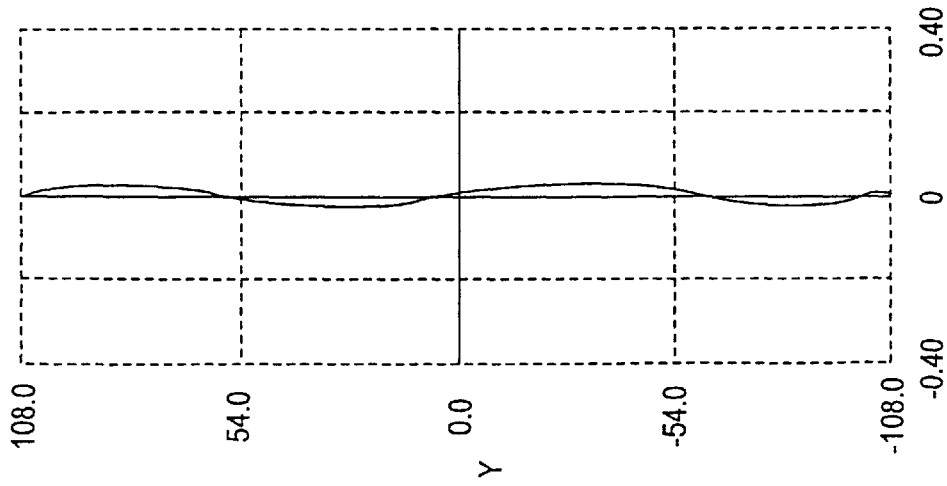

The seventh embodiment of the present invention is shown in FIG. 14 and the aberrations with respect thereto are shown in FIGS. 24(A), 24(B) and 24(C). The seventh embodiment of the present invention utilizes an fθ element wherein the front side surface is a rotationally symmetrical aspherical surface such as shown in FIG. 4 while the rear side surface is an advanced anamorphic aspherical surface as is shown in FIG. 6.

In the seventh embodiment, the lens element 30 is not a cylindrical lens element. Further, in the seventh embodiment, both surfaces of the fθ element 40 are tilted as indicated by β1 and β2. Decentering of the first surface is indicated by δz1.

TABLE 8

| Surface # | | ry | rz | d | n |
|---|---|---|---|---|---|
| 1 | | −110.886 | 55.424 | 2.000 | 1.48617 |
| 2 | | Inf. | — | 113.000 | |
| 3 | | Inf. | — | 50.000 | |
| 4 | | −654.778 | — | 5.000 | 1.48617 |
| 5 | | −248.332 | −115.165 | (5.000) | (1.48617) |
| 6 | | (−654.778) | — | 153.781 | |
| α1 | 8.00° | | | | |
| α2 | 7.44° | | | | |
| β1 | 8.00° | δz1 | −8.75 | | |
| β2 | 1.50° | δz2 | | | |

As noted above, for the seventh embodiment, the front side surface 42 is a rotationally symmetrical aspherical surface such as shown in FIG. 4. The aspherical surface data for such a surface is defined with respect to relations (1) and (2) and are as follows:

$$K = 0.1574$$
$$A4 = 5.29081 \times 10^{-10}$$
$$A6 = -3.50114 \times 10^{-11}$$
$$A8 = -2.45357 \times 10^{-18}$$
$$A10 = -1.62493 \times 10^{-21}$$
$$A12 = 1.67621 \times 10^{-22}$$

As noted above, the back surface 41 of the fθ element of the seventh embodiment is an advanced anamorphic aspherical surface such as shown in FIG. 6 with aspherical surface data defined in relations (4) and (5) and are as follows:

$$k = 0$$
$$AM2 = -1.26106 \times 10^{-5} \quad AS2 = 2.51973 \times 10^{-7}$$
$$AM4 = 3.18316 \times 10^{-8} \quad AS4 = -7.13046 \times 10^{-11}$$
$$AM6 = -1.12693 \times 10^{-11} \quad AS6 = -2.32811 \times 10^{-14}$$
$$AM8 = -6.27219 \times 10^{-16} \quad AS8 = 6.72688 \times 10^{-18}$$
$$AM10 = -1.95305 \times 10^{-19}$$
$$AM12 = 1.06997 \times 10^{-22}$$

Eighth Embodiment

The eighth embodiment of the present invention is shown in FIG. 15 and the aberrations with respect thereto are shown in FIGS. 25(A), 25(B) and 25(C). The eighth embodiment of the present invention utilizes an fθ element wherein the front side surface is a rotataionally symmetrical aspherical surface such as shown in FIG. 4 while the rear side surface is a two-dimensional polynomial aspherical surface as is shown in FIG. 7.

In the eighth embodiment, the lens element 30 is a cylindrical lens element. The tilt of the fθ element in the eighth embodiment is the same as that in the first embodiment and the decentering of the first surface is indicated by δz1. Also, the second surface is coaxial with the first surface and accordingly is not decentered with respect thereto.

TABLE 9

| Surface # | ry | rz | d | n |
|---|---|---|---|---|
| 1 | Inf | 55.424 | 2.000 | 1.48617 |
| 2 | Inf. | — | 113.000 | |
| 3 | Inf. | — | 50.000 | |
| 4 | −469.052 | — | 5.000 | 1.48617 |

TABLE 9-continued

| Surface # | ry | rz | d | n |
|---|---|---|---|---|
| 5 | −316.325 | see table 16 | (5.000) | (1.48617) |
| 6 | (−469.052) | — | 132.224 | |
| α1 | 8.00° | | | |
| α2 | 15.31° | | | |
| β1 | 7.00° | δz1 | 1.50 | |
| β2 | | δz2 | | |

As noted above, for the eighth embodiment, the front side surface 42 is a rotationally symmetrical aspherical surface such as shown in FIG. 4. The aspherical surface data for such a surface is defined with respect to relations (1) and (2) and are as follows:

$K = 0.$
$A4 = 2.98263 \times 10^{-9}$
$A6 = -1.10613 \times 10^{-13}$
$A8 = -1.33016 \times 10^{-15}$
$A10 = -1.40437 \times 10^{-20}$ As noted above, the back surface 41 of the fθ element of the eighth embodiment is a two-dimensional polynomial aspherical surface with coefficients as shown in Table 16.

Ninth Embodiment

Figure 16:
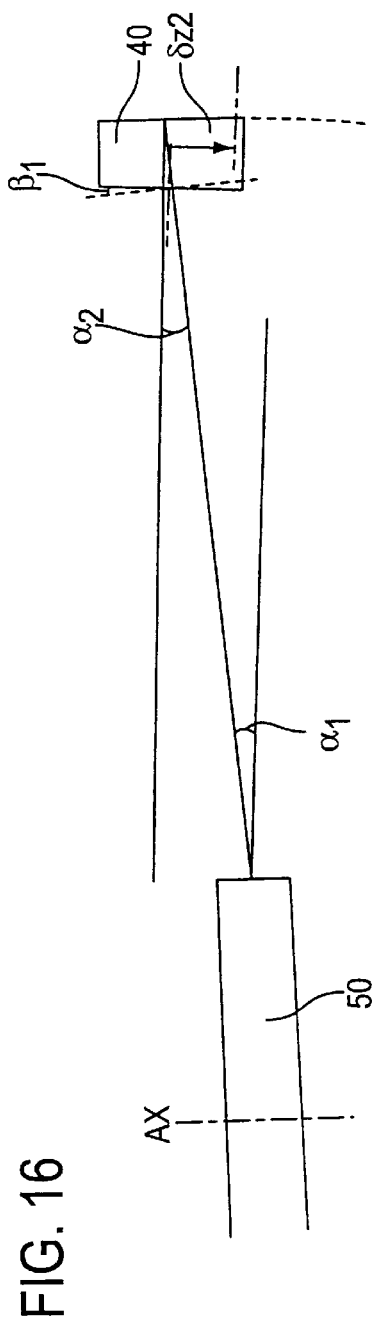
FIG. 16 shows an arrangement of the components of the scanning optical system according to a ninth embodiment of the present invention, taken in the auxiliary scanning direction.
Figure 26C:
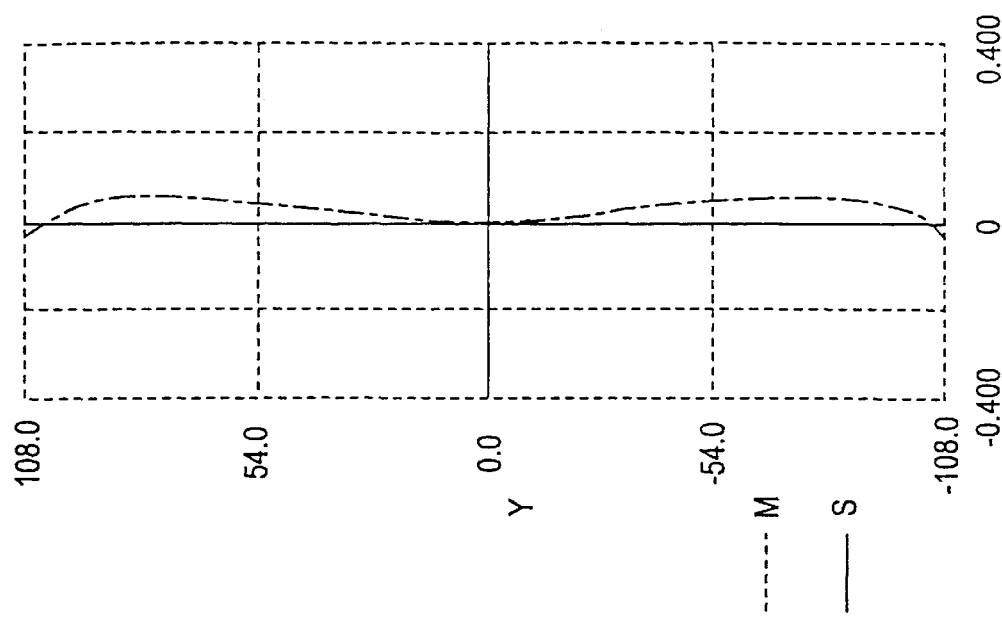
FIGS. 26(A), 26(B) and 26(C) are graphs showing the linearity error, the curvature of field and the bowing of a scanning line, respectively, for a ninth embodiment of the present invention as illustrated in FIG. 16.
Figure 26B:
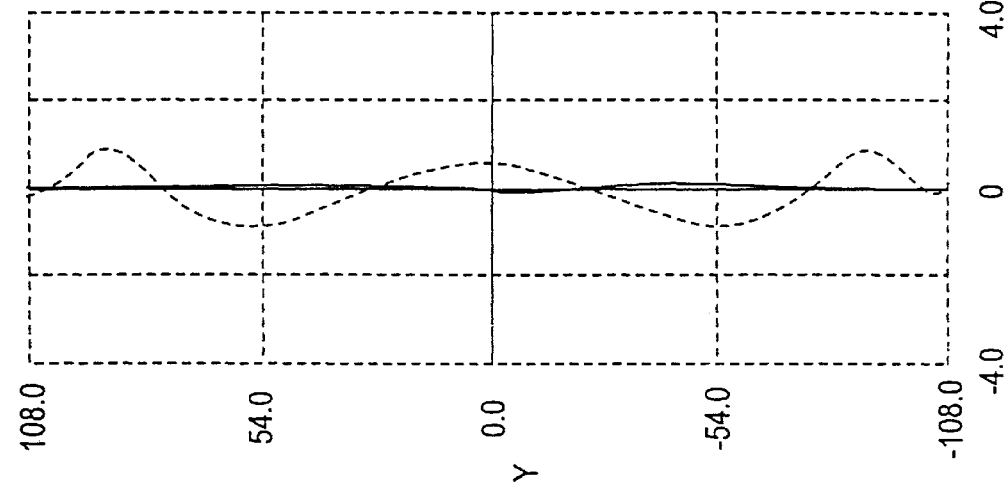
Figure 26A:
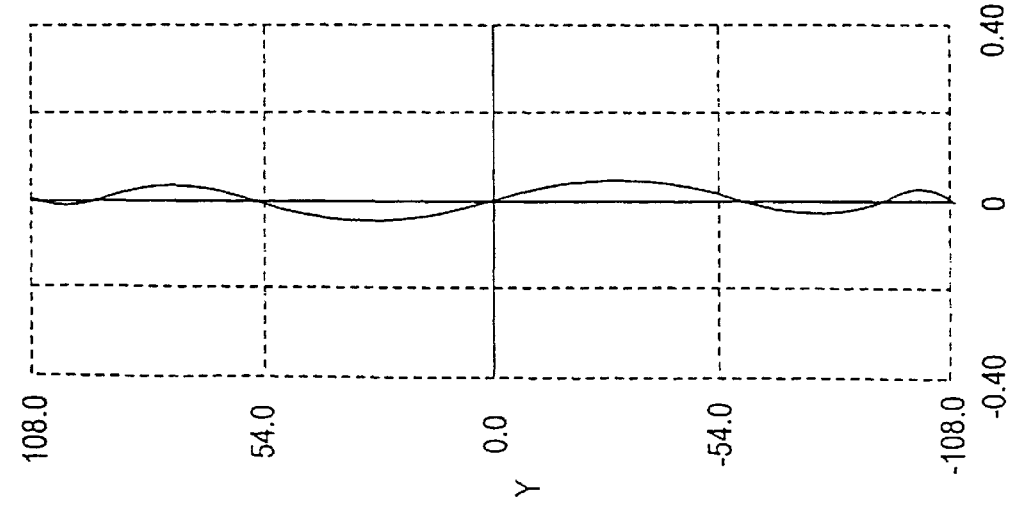

The ninth embodiment of the present invention is shown in FIG. 16 and the aberrations with respect thereto are shown in FIGS. 26(A), 26(B) and 26(C). The ninth embodiment of the present invention utilizes an fθ element wherein the front side surface is an advanced anamorphic aspherical surface such as shown in FIG. 6 while the rear side surface is a two-dimensional polynomial aspherical surface as is shown in FIG. 7.

In the ninth embodiment, the lens element 30 is a cylindrical lens element. The tilt of the fθ element in the ninth embodiment is the same as that in the first embodiment and the first surface is not decentered. However, the second surface is decentered with respect to the first surface as indicated by the value for δz2.

TABLE 10

| Surface # | ry | rz | d | n |
|---|---|---|---|---|
| 1 | Inf. | 55.424 | 2.000 | 1.48617 |
| 2 | Inf. | — | 113.000 | |
| 3 | Inf. | — | 50.000 | |
| 4 | −247.841 | −6251.154 | 5.000 | 1.48617 |
| 5 | −264.509 | see table 17 | (5.000) | (1.48617) |
| 6 | (−247.841) | −6251.154 | 131.914 | |
| α1 | 8.00° | | | |
| α2 | 7.52° | | | |
| β1 | 7.00° | δz1 | | |
| β2 | | δz2 | −3.93 | |

As noted above, for the ninth embodiment, the front surface 42 is an advanced anamorphic aspherical surface as shown in FIG. 6. The aspherical surface data for such a surface is defined with respect to relations (4) and (5) and are as follows:

$K = 0.$
$AM2 = 2.73792 \times 10^{-3}$  $AS2 = 2.03642 \times 10^{-8}$
$AM4 = -3.62140 \times 10^{-11}$  $AS4 = -1.03393 \times 10^{-11}$
$AM6 = -5.98156 \times 10^{-11}$  $AS6 = -1.17040 \times 10^{-14}$
$AM8 = -6.87744 \times 10^{-18}$  $AS8 = 1.11903 \times 10^{-16}$
$AM10 = -4.97404 \times 10^{-20}$
$AM12 = 2.58205 \times 10^{-25}$ As noted above, the back surface 41 of the fθ element of the ninth embodiment is a two-dimensional polynomial aspherical surface with coefficients as shown in Table 17.

Tenth Embodiment

Figure 17:
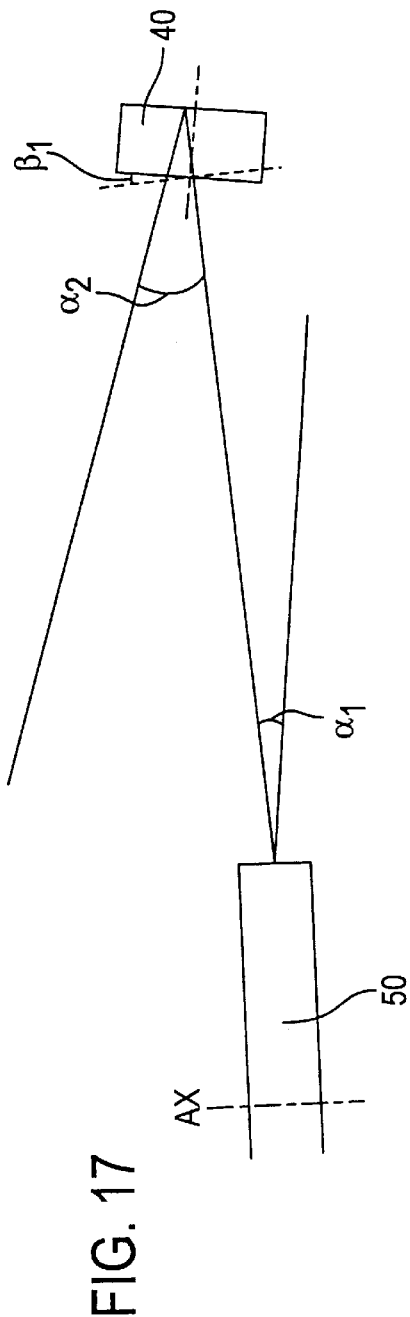
FIG. 17 shows an arrangement of the components of the scanning optical system according to a tenth embodiment of the present invention, taken in the auxiliary scanning direction.
Figure 27C:
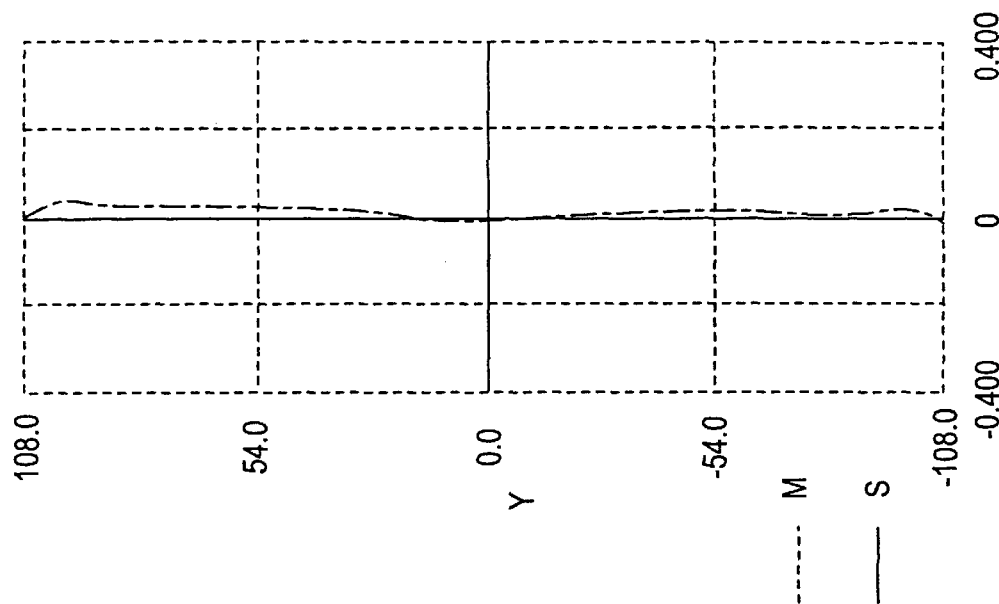
FIGS. 27(A), 27(B) and 27(C) are graphs showing the linearity error, the curvature of field and the bowing of a scanning line, respectively, for a tenth embodiment of the present invention as illustrated in FIG. 17.
Figure 27B:
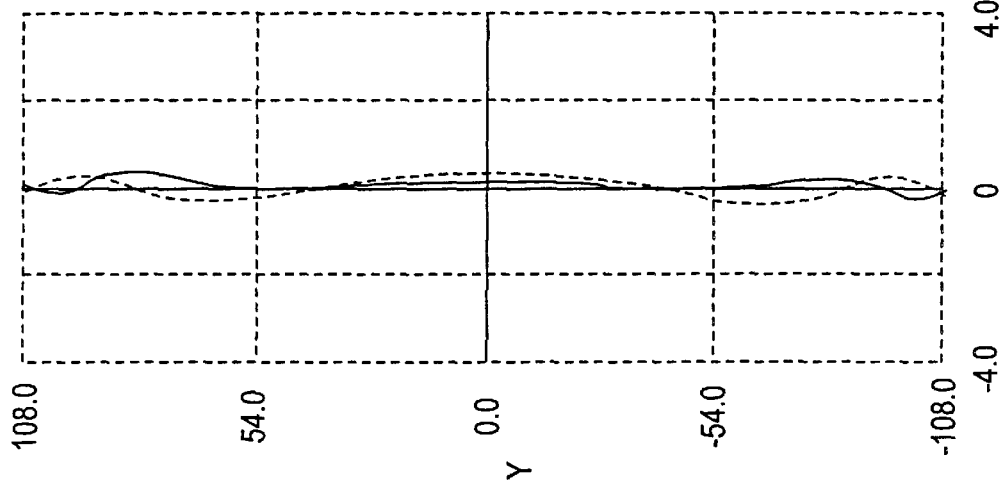
Figure 27A:
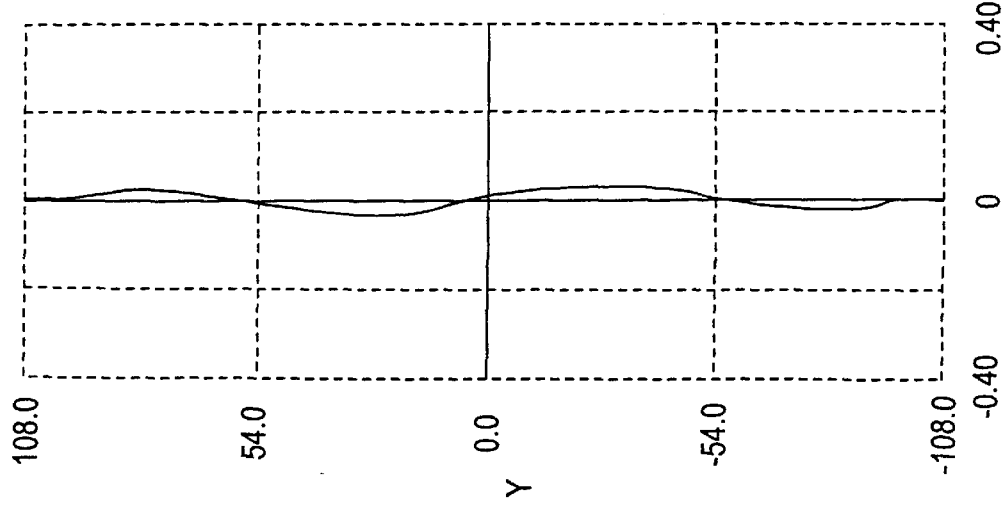

The tenth embodiment of the present invention is shown in FIG. 17 and the aberrations with respect thereto are shown in FIGS. 27(A), 27(B) and 27(C). The tenth embodiment of the present invention utilizes an fθ element wherein the front side surface is an advanced anamorphic aspherical surface such as shown in FIG. 6 while the rear side surface is a two-dimensional polynomial aspherical surface as is shown in FIG. 7.

In the tenth embodiment, the lens element 30 is not a cylindrical lens element. The tilt of the fθ element in the tenth embodiment is indicated by β1. Further in the tenth embodiment, neither the front side surface nor the rear side surface are decentered.

TABLE 11

| Surface # | ry | rz | d | n |
|---|---|---|---|---|
| 1 | −66.942 | 55.424 | 2.000 | 1.48617 |
| 2 | Inf. | — | 113.000 | |
| 3 | Inf. | — | 50.000 | |
| 4 | −283.298 | −2306.102 | 5.000 | 1.48617 |
| 5 | −234.874 | see table 18 | (5.000) | (1.48617) |
| 6 | (−283.298) | −2306.102 | 161.048 | |
| α1 | 10.00° | | | |
| α2 | 21.10° | | | |
| β1 | 10.10° | δz1 | | |
| β2 | | δz2 | | |

As noted above, for the tenth embodiment, the front surface 42 is an advanced anamorphic aspherical surface such as shown in FIG. 6. The aspherical surface data for such a surface is defined with respect to relations (4) and (5) and are as follows:

$K = 0.$
$AM2 = 6.98306 \times 10^{-4}$  $AS2 = 2.24932 \times 10^{-8}$
$AM4 = 1.39297 \times 10^{-10}$  $AS4 = -1.13011 \times 10^{-11}$
$AM6 = -3.22015 \times 10^{-11}$  $AS6 = -6.99320 \times 10^{-15}$
$AM8 = -8.12872 \times 10^{-18}$  $AS8 = 1.03965 \times 10^{-16}$
$AM10 = 6.81440 \times 10^{-21}$
$AM12 = 2.58620 \times 10^{-25}$ As noted above, the back surface 41 of the fθ element of the tenth embodiment is a two-dimensional polynomial aspherical surface with coefficients as shown in Table 18.

TABLE 12

TWO-DIMENSIONAL POLYNOMIAL ASHPERICAL SURFACE DATA

| m = | n = 0 | n = 1 | n = 2 | n = 3 |
|---|---|---|---|---|
| 0 |  | 0.00 | $-2.7792 \times 10^{-3}$ | 0.00 |
| 1 | 0.00 | 0.00 | 0.00 | 0.00 |
| 2 | $-4.2892 \times 10^{-6}$ | $1.9530 \times 10^{-7}$ | $1.8711 \times 10^{-7}$ | 0.00 |
| 3 | 0.00 | 0.00 | 0.00 | 0.00 |
| 4 | $2.8319 \times 10^{-8}$ | $2.3400 \times 10^{-9}$ | $-1.5713 \times 10^{-11}$ | 0.00 |
| 5 | 0.00 | 0.00 | 0.00 | 0.00 |
| 6 | $-2.7032 \times 10^{-13}$ | $-2.0545 \times 10^{-12}$ | $-2.9837 \times 10^{-15}$ | 0.00 |
| 7 | 0.00 | 0.00 | 0.00 | 0.00 |
| 8 | $-1.8529 \times 10^{-15}$ | $7.3800 \times 10^{-16}$ | $-1.0991 \times 10^{-17}$ | 0.00 |
| 9 | 0.00 | 0.00 | 0.00 | 0.00 |
| 10 | $1.5635 \times 10^{-18}$ | $-9.5417 \times 10^{-20}$ | $1.7083 \times 10^{-21}$ |  |
| 11 | 0.00 | 0.00 |  |  |
| 12 | $2.1178 \times 10^{-22}$ |  |  |  |

| m = | n = 4 | n = 5 | n = 6 |
|---|---|---|---|
| 0 | $-1.6326 \times 10^{-7}$ | 0.00 | 0.00 |
| 1 | 0.00 | 0.00 | 0.00 |
| 2 | $1.2654 \times 10^{-10}$ | 0.00 | 0.00 |
| 3 | 0.00 | 0.00 | 0.00 |
| 4 | $-7.8969 \times 10^{-14}$ | 0.00 | 0.00 |
| 5 | 0.00 | 0.00 | 0.00 |
| 6 | $4.8950 \times 10^{-19}$ | 0.00 | 0.00 |
| 7 | 0.00 | 0.00 |  |
| 8 | $4.5472 \times 10^{-21}$ |  |  |

TABLE 13

TWO-DIMENSIONAL POLYNOMIAL ASHPERICAL SURFACE DATA

| m = | n = 0 | n = 1 | n = 2 | n = 3 |
|---|---|---|---|---|
| 0 |  | 0.00 | $-2.5261 \times 10^{-3}$ | 0.00 |
| 1 | 0.00 | 0.00 | 0.00 | 0.00 |
| 2 | $1.5731 \times 10^{-4}$ | $2.1407 \times 10^{-6}$ | $9.2971 \times 10^{-8}$ | 0.00 |
| 3 | 0.00 | 0.00 | 0.00 | 0.00 |
| 4 | $3.6460 \times 10^{-8}$ | $-5.5930 \times 10^{-10}$ | $1.1219 \times 10^{-11}$ | 0.00 |
| 5 | 0.00 | 0.00 | 0.00 | 0.00 |
| 6 | $-8.6223 \times 10^{-12}$ | $2.4079 \times 10^{-13}$ | $-4.6180 \times 10^{-15}$ | 0.00 |
| 7 | 0.00 | 0.00 | 0.00 | 0.00 |
| 8 | $4.2369 \times 10^{-16}$ | $-9.1124 \times 10^{-17}$ | $2.0622 \times 10^{-18}$ | 0.00 |
| 9 | 0.00 | 0.00 | 0.00 | 0.00 |
| 10 | $-2.4803 \times 10^{-19}$ | $1.7793 \times 10^{-20}$ | $2.8491 \times 10^{-21}$ |  |
| 11 | 0.00 | 0.00 |  |  |
| 12 | $4.6502 \times 10^{-23}$ |  |  |  |

| m = | n = 4 | n = 5 | n = 6 |
|---|---|---|---|
| 0 | $-6.3215 \times 10^{-8}$ | 0.00 | 0.00 |
| 1 | 0.00 | 0.00 | 0.00 |
| 2 | $3.5299 \times 10^{-11}$ | 0.00 | 0.00 |
| 3 | 0.00 | 0.00 | 0.00 |
| 4 | $1.7524 \times 10^{-14}$ | 0.00 | 0.00 |
| 5 | 0.00 | 0.00 | 0.00 |
| 6 | $-1.5894 \times 10^{-17}$ | 0.00 | 0.00 |
| 7 | 0.00 | 0.00 |  |
| 8 | $1.3137 \times 10^{-21}$ |  |  |

TABLE 14

TWO-DIMENSIONAL POLYNOMIAL ASHPERICAL SURFACE DATA

| m = | n = 0 | n = 1 | n = 2 | n = 3 |
|---|---|---|---|---|
| 0 |  | 0.00 | $-2.3838 \times 10^{-13}$ | 0.00 |
| 1 | 0.00 | 0.00 | 0.00 | 0.00 |
| 2 | $-7.4384 \times 10^{-6}$ | $8.3378 \times 10^{-7}$ | $1.8455 \times 10^{-7}$ | 0.00 |
| 3 | 0.00 | 0.00 | 0.00 | 0.00 |
| 4 | $3.2902 \times 10^{-8}$ | $1.4117 \times 10^{-9}$ | $-1.1604 \times 10^{-11}$ | 0.00 |
| 5 | 0.00 | 0.00 | 0.00 | 0.00 |
| 6 | $-2.0572 \times 10^{-12}$ | $-1.6854 \times 10^{-12}$ | $2.6112 \times 10^{-14}$ | 0.00 |
| 7 | 0.00 | 0.00 | 0.00 | 0.00 |
| 8 | $-1.5504 \times 10^{-15}$ | $7.4853 \times 10^{-16}$ | $-2.090l \times 10^{-17}$ | 0.00 |
| 9 | 0.00 | 0.00 | 0.00 | 0.00 |
| 10 | $-1.6044 \times 10^{-18}$ | $-1.1350 \times 10^{-19}$ | $3.7126 \times 10^{-21}$ |  |
| 11 | 0.00 | 0.00 |  |  |
| 12 | $2.3680 \times 10^{-22}$ |  |  |  |

| m = | n = 4 | n = 5 | n = 6 |
|---|---|---|---|
| 0 | $-1.5293 \times 10^{-7}$ | 0.00 | 0.00 |
| 1 | 0.00 | 0.00 | 0.00 |
| 2 | $5.0614 \times 10^{-11}$ | 0.00 | 0.00 |
| 3 | 0.00 | 0.00 | 0.00 |
| 4 | $-5.4298 \times 10^{-14}$ | 0.00 | 0.00 |
| 5 | 0.00 | 0.00 | 0.00 |
| 6 | $1.1852 \times 10^{-17}$ | 0.00 | 0.00 |
| 7 | 0.00 | 0.00 |  |
| 8 | $7.7161 \times 10^{-21}$ |  |  |

TABLE 15

TWO-DIMENSIONAL POLYNOMIAL ASHPERICAL SURFACE DATA

| m = | n = 0 | n = 1 | n = 2 | n = 3 |
|---|---|---|---|---|
| 0 |  | 0.00 | $5.0295 \times 10^{-4}$ | 0.00 |
| 1 | 0.00 | 0.00 | 0.00 | 0.00 |
| 2 | $7.5317 \times 10^{-5}$ | $-1.3677 \times 10^{-6}$ | $4.8688 \times 10^{-7}$ | 0.00 |
| 3 | 0.00 | 0.00 | 0.00 | 0.00 |
| 4 | $5.0486 \times 10^{-11}$ | $1.3693 \times 10^{-9}$ | $5.0350 \times 10^{-11}$ | 0.00 |
| 5 | 0.00 | 0.00 | 0.00 | 0.00 |
| 6 | $-1.7633 \times 10^{-11}$ | $-7.6046 \times 10^{-14}$ | $-1.3312 \times 10^{-14}$ | 0.00 |
| 7 | 0.00 | 0.00 | 0.00 | 0.00 |
| 8 | $-6.7518 \times 10^{-16}$ | $5.1640 \times 10^{-17}$ | $9.1883 \times 10^{-18}$ | 0.00 |
| 9 | 0.00 | 0.00 | 0.00 | 0.00 |
| 10 | $-2.9068 \times 10^{-21}$ | $8.4809 \times 10^{-21}$ | $2.1530 \times 10^{-24}$ |  |
| 11 | 0.00 | 0.00 |  |  |
| 12 | $-3.3949 \times 10^{-22}$ |  |  |  |

| m = | n = 4 | n = 5 | n = 6 |
|---|---|---|---|
| 0 | 0.00 | 0.00 | 0.00 |
| 1 | 0.00 | 0.00 | 0.00 |
| 2 | 0.00 | 0.00 | 0.00 |
| 3 | 0.00 | 0.00 | 0.00 |
| 4 | 0.00 | 0.00 | 0.00 |
| 5 | 0.00 | 0.00 | 0.00 |
| 6 | 0.00 | 0.00 | 0.00 |
| 7 | 0.00 | 0.00 |  |
| 8 | 0.00 |  |  |

TABLE 16

TWO-DIMENSIONAL POLYNOMIAL ASHPERICAL SURFACE DATA

| m = | n = 0 | n = 1 | n = 2 | n = 3 |
|---|---|---|---|---|
| 0 |  | 0.00 | $-2.227 \times 10^{-3}$ | 0.00 |
| 1 | 0.00 | 0.00 | 0.00 | 0.00 |
| 2 | $-4.1455 \times 10^{-6}$ | $2.2522 \times 10^{-6}$ | $4.7108 \times 10^{-8}$ | 0.00 |
| 3 | 0.00 | 0.00 | 0.00 | 0.00 |
| 4 | $1.2230 \times 10^{-8}$ | $3.0106 \times 10^{-10}$ | $-2.0221 \times 10^{-11}$ | 0.00 |
| 5 | 0.00 | 0.00 | 0.00 | 0.00 |
| 6 | $-2.4212 \times 10^{-12}$ | $-1.2888 \times 10^{-13}$ | $1.1452 \times 10^{-14}$ | 0.00 |
| 7 | 0.00 | 0.00 | 0.00 | 0.00 |

TABLE 16-continued

TWO-DIMENSIONAL POLYNOMIAL ASHPERICAL SURFACE DATA

| | | | | |
|---|---|---|---|---|
| 8 | $4.5711 \times 10^{-16}$ | $2.1434 \times 10^{-17}$ | $-3.7308 \times 10^{-18}$ | 0.00 |
| 9 | 0.00 | 0.00 | 0.00 | 0.00 |
| 10 | $-1.7574 \times 10^{-19}$ | $-1.2870 \times 10^{-21}$ | $3.3725 \times 10^{-22}$ | |
| 11 | 0.00 | 0.00 | | |
| 12 | $1.1023 \times 10^{-23}$ | | | |

| m = | n = 4 | n = 5 | n = 6 |
|---|---|---|---|
| 0 | $-2.4274 \times 10^{-7}$ | 0.00 | 0.00 |
| 1 | 0.00 | 0.00 | 0.00 |
| 2 | $3.1464 \times 10^{-11}$ | 0.00 | 0.00 |
| 3 | 0.00 | 0.00 | 0.00 |
| 4 | $-4.5240 \times 10^{-14}$ | 0.00 | 0.00 |
| 5 | 0.00 | 0.00 | 0.00 |
| 6 | $-2.6283 \times 10^{-18}$ | 0.00 | 0.00 |
| 7 | 0.00 | 0.00 | |
| 8 | $1.5821 \times 10^{-21}$ | | |

TABLE 17

TWO-DIMENSIONAL POLYNOMIAL ASHPERICAL SURFACE DATA

| m = | n = 0 | n = 1 | n = 2 | n = 3 |
|---|---|---|---|---|
| 0 | | 0.00 | $-2.5073 \times 10^{-3}$ | 0.00 |
| 1 | 0.00 | 0.00 | 0.00 | 0.00 |
| 2 | $8.6884 \times 10^{-4}$ | $1.7933 \times 10^{-6}$ | $2.7377 \times 10^{-7}$ | 0.00 |
| 3 | 0.00 | 0.00 | 0.00 | 0.00 |
| 4 | $3.5026 \times 10^{-8}$ | $-1.4942 \times 10^{-10}$ | $-2.9541 \times 10^{-11}$ | 0.00 |
| 5 | 0.00 | 0.00 | 0.00 | 0.00 |
| 6 | $-2.0307 \times 10^{-11}$ | $-1.4546 \times 10^{-13}$ | $1.1463 \times 10^{-14}$ | 0.00 |
| 7 | 0.00 | 0.00 | 0.00 | 0.00 |
| 8 | $-1.5338 \times 10^{-16}$ | $-2.7245 \times 10^{-17}$ | $9.0593 \times 10^{-18}$ | 0.00 |
| 9 | 0.00 | 0.00 | 0.00 | 0.00 |
| 10 | $-5.4838 \times 10^{-19}$ | $-3.3770 \times 10^{-20}$ | $2.8984 \times 10^{-21}$ | |
| 11 | 0.00 | 0.00 | | |
| 12 | $1.0233 \times 10^{-22}$ | | | |

| m = | n = 4 | n = 5 | n = 6 |
|---|---|---|---|
| 0 | $1.3147 \times 10^{-07}$ | 0.00 | 0.00 |
| 1 | 0.00 | 0.00 | 0.00 |
| 2 | $-1.3907 \times 10^{-11}$ | 0.00 | 0.00 |
| 3 | 0.00 | 0.00 | 0.00 |
| 4 | $1.0009 \times 10^{-14}$ | 0.00 | 0.00 |
| 5 | 0.00 | 0.00 | 0.00 |
| 6 | $-1.1209 \times 10^{-17}$ | 0.00 | 0.00 |
| 7 | 0.00 | 0.00 | |
| 8 | $5.8364 \times 10^{-21}$ | | |

TABLE 18

TWO-DIMENSIONAL POLYNOMIAL ASHPERICAL SURFACE DATA

| m = | n = 0 | n = 1 | n = 2 | n = 3 |
|---|---|---|---|---|
| 0 | | 0.00 | $-1.9838 \times 10^{-3}$ | 0.00 |
| 1 | 0.00 | 0.00 | 0.00 | 0.00 |
| 2 | $1.9766 \times 10^{-4}$ | $5.9579 \times 10^{-6}$ | $1.6417 \times 10^{-7}$ | 0.00 |
| 3 | 0.00 | 0.00 | 0.00 | 0.00 |
| 4 | $3.7780 \times 10^{-8}$ | $-6.8171 \times 10^{-10}$ | $-2.6411 \times 10^{-12}$ | 0.00 |
| 5 | 0.00 | 0.00 | 0.00 | 0.00 |
| 6 | $-1.3456 \times 10^{-11}$ | $2.6524 \times 10^{-13}$ | $4.4057 \times 10^{-15}$ | 0.00 |
| 7 | 0.00 | 0.00 | 0.00 | 0.00 |
| 8 | $3.0100 \times 10^{-16}$ | $-4.6579 \times 10^{-17}$ | $6.1601 \times 10^{-18}$ | 0.00 |
| 9 | 0.00 | 0.00 | 0.00 | 0.00 |
| 10 | $-2.3770 \times 10^{-19}$ | $-2.7708 \times 10^{-21}$ | $3.5221 \times 10^{-21}$ | |
| 11 | 0.00 | 0.00 | | |
| 12 | $3.5217 \times 10^{-23}$ | | | |

TABLE 18-continued

TWO-DIMENSIONAL POLYNOMIAL ASHPERICAL SURFACE DATA

| m = | n = 4 | n = 5 | n = 6 |
|---|---|---|---|
| 0 | $3.8418 \times 10^{-07}$ | 0.00 | 0.00 |
| 1 | 0.00 | 0.00 | 0.00 |
| 2 | $7.2646 \times 10^{-13}$ | 0.00 | 0.00 |
| 3 | 0.00 | 0.00 | 0.00 |
| 4 | $2.5924 \times 10^{-14}$ | 0.00 | 0.00 |
| 5 | 0.00 | 0.00 | 0.00 |
| 6 | $-1.1444 \times 10^{-17}$ | 0.00 | 0.00 |
| 7 | 0.00 | 0.00 | |
| 8 | $6.0651 \times 10^{-21}$ | | |

Although the present invention has been described with respect to particular means, structure, features, embodiments and components, it is to be understood that the present invention is not to be limited to the particulars disclosed herein but extends to all the equivalents within the scope of the claims. The particulars disclosed in the present application are by way of example only and are not to be construed as limiting the scope of the claims, which are directed to all equivalents of the invention described in the present disclosure.

What is claimed:

1. A scanning optical system comprising:

a light deflector that rotates about a rotational axis transverse to a main scanning direction;

a light emitter that emits a beam of light which scans a scanning surface along the main scanning direction, said beam of light emitted by said emitter being incident onto said light deflector; and an optical element that refracts and reflects said beam of light, deflected by said light deflector, said optical element having a first surface onto which said beam of light from said light deflector is incident and a second surface provided with a reflective surface, said reflective surface reflecting said beam of light after said beam of light is transmitted through said optical element, said beam of light again being transmitted through said optical element after being reflected by said reflected surface to be emitted from said optical element at said first surface, at least said second surface comprising a surface which has no rotational axis and which is not rotationally symmetrical about an optical axis of said scanning optical system, an optical axis of said optical element forming an oblique angle with respect to the rotational axis of said light deflector.

2. The scanning optical system according to claim 1, wherein said first surface of said optical element comprises an advanced anamorphic aspherical surface.

3. The scanning optical system according to claim 1, wherein said second surface of said optical element is an advanced anamorphic aspherical surface.

4. The scanning optical system according to claim 1, wherein said second surface of said optical element comprises a two-dimensional polynomial aspherical surface.

5. The optical scanning system according to claim 1, said first surface of said optical element comprising a rotationally symmetrical aspherical surface.

6. The optical scanning system according to claim 1, said first surface of said optical element comprising a toric aspherical surface.

7. The optical scanning system according to claim 1, said first surface of said optical element comprising a two-dimensional polynomial aspherical surface.

\* \* \* \* \*